US009692231B2

(12) United States Patent
Nguyen

(10) Patent No.: US 9,692,231 B2
(45) Date of Patent: Jun. 27, 2017

(54) MANAGING POWER FEEDS THROUGH WAVEFORM MONITORING

(71) Applicant: Amazon Technologies, Inc., Reno, NV (US)

(72) Inventor: Huyen Van Nguyen, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 751 days.

(21) Appl. No.: 14/020,499

(22) Filed: Sep. 6, 2013

(65) Prior Publication Data

US 2015/0074431 A1 Mar. 12, 2015

(51) Int. Cl.
*H02J 3/00* (2006.01)
*H02J 9/06* (2006.01)
*G06F 1/30* (2006.01)

(52) U.S. Cl.
CPC ............... *H02J 3/006* (2013.01); *H02J 9/06* (2013.01)

(58) Field of Classification Search
CPC .... H02J 3/006; H02J 9/06; H02J 9/062; H02J 3/005; H02J 3/14; G06F 1/305
USPC ......................................................... 700/292
See application file for complete search history.

(56) References Cited

U.S. PATENT DOCUMENTS

| | | | | | |
|---|---|---|---|---|---|
| 6,191,500 | B1 * | 2/2001 | Toy | ........................ | H02J 3/46 307/64 |
| 6,980,911 | B2 * | 12/2005 | Eaton | ..................... | H02J 3/005 324/96 |
| 8,146,374 | B1 * | 4/2012 | Zien | ...................... | H05K 7/208 62/101 |
| 2004/0070278 | A1 * | 4/2004 | Divan | ..................... | H02J 3/006 307/64 |
| 2004/0212512 | A1 * | 10/2004 | Stewart | ................ | G01R 15/142 340/657 |
| 2005/0278075 | A1 * | 12/2005 | Rasmussen | ............... | H02J 9/06 700/286 |
| 2009/0281679 | A1 | 11/2009 | Taft et al. | | |
| 2011/0061015 | A1 * | 3/2011 | Drees | ..................... | G05B 15/02 715/771 |
| 2011/0208366 | A1 | 8/2011 | Taft | | |

(Continued)

OTHER PUBLICATIONS

Pelley et al., "Power Routing: Dynamic Power Provisioning in the Data Center", Mar. 13-17, 2010, ACM, 978-1-60558-839—Jan. 10, 2003, pp. 231-242.*

(Continued)

*Primary Examiner* — Jason Lin
(74) *Attorney, Agent, or Firm* — Robert C. Kowert; Meyertons, Hood, Kivlin, Kowert & Goetzel, P.C.

(57) ABSTRACT

Managing power feeds includes monitoring a waveform of a high-voltage power feed supplied to an electrical load to detect potential interruption of the high-voltage power feed and switching to another power feed to supply power to the electrical load in response to identifying the waveform pattern. Monitoring a waveform includes processing the waveform to determine if one or more waveform patterns are present in the waveform. A waveform pattern indicates, by its presence in a waveform of a power feed, a power event associated with the power feed, and some waveform patterns indicate potential interruption of the power feed. Switching to another power feed in response to determining potential interruption of the power feed based on waveform monitoring enables an uninterrupted power supply.

17 Claims, 12 Drawing Sheets

(56) References Cited

U.S. PATENT DOCUMENTS

| | | | | |
|---|---|---|---|---|
| 2012/0056481 A1* | 3/2012 | Corhodzic | ............. | G06F 1/263 307/66 |
| 2013/0049476 A1 | 2/2013 | Lathrop | | |
| 2014/0081472 A1* | 3/2014 | Bates | ................. | H02J 13/0006 700/286 |
| 2014/0101462 A1* | 4/2014 | Rose | ..................... | G06F 1/263 713/300 |
| 2014/0379160 A1* | 12/2014 | Fallon | ................... | G06Q 50/06 700/297 |

OTHER PUBLICATIONS

International Search Report and Written Opinion from PCT/US14/54180, issued Dec. 12, 2014, Amazon Technologies, Inc., pp. 1-15.

U.S. Appl. No. 14/449,032, filed Jul. 31, 2014, Huyen Van Nguyen.

Passmore, Brandon, "Design and Development of a Low Cost, Manufacturable High Voltage Power Module for Energy Storage Systems—Phase I SBIR", Sep. 27, 2012, pp. 1-14., Arkansas Power Electronics International, Fayetteville, AR.

"Understanding Electric Demand", National Grid, Dec. 2005, pp. 1-4., Syracruse, NY.

Spears, Ed, "Parallel UPS configurations—Connecting multiple UPS modules for added capacity or redundancy", Jan. 2009, pp. 1-10., Eaton Corporation.

"Understanding Demand and Consumption", Duke Energy, http://www.think-energy.net/KWvsKWH.htm, pp. 1-8. [Retrieved Jul. 10, 2014].

U.S. Appl. No. 14/463,476, filed Aug. 19, 2014, Huyen van Nguyen.

"Energy Storage Modules, Developing a Smarter Grid Using Battery Energy Storage Systmes", ABB Inc., May 31, 2012, pp. 1-37.

"Energy Storage Modules (ESM), Up to 4 MW Output Voltage Range of 120 Volts to 40.5 KVv". ABB Inc., Apr. 2012, pp. 1-20.

"EssPro Energy Storage Power Conversion System (PCS) The Power to Control Energy", ABB Inc., 2014, pp. 1-12.

"EssPro Energy Storage Grid Substation the Power to Control Energy", ABB Inc., 2014—pp. 1-8.

M. Wang, et al "Real-Time Power Quality Waveform Recognition with a Programmable Digital Signal Processor", Department of Electrical Engineering, University of Washington, Jun. 3, 2010, pp. 1-7.

* cited by examiner

MANAGING POWER FEEDS THROUGH WAVEFORM MONITORING

BACKGROUND

Organizations such as on-line retailers, cloud computing providers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 480 volts). A network of cabling, bus bars, power connectors, and power distribution units, is used to deliver the power at the lower voltage to numerous specific components in the facility.

A computing facility may receive one or more power feeds from one or more external power sources. For example, a power feed may originate from a utility power source. The power feed originating from a utility power source may be passed along power transmission lines at a high voltage (e.g., 115 kilovolts) to an electrical substation, which may include a transformer that can step down the power feed voltage to a lower voltage and supply the power feed to the computing facility. Power feeds may be stepped down by a substation transformer to a low voltage (e.g., 480 volts) or a medium voltage that is distributed to additional transformers to be stepped down further to a low voltage.

From time to time, a power feed from an external power source may experience disturbances that may interrupt normal receipt of power at the computing facility. For example, a lightning strike may cause a brief fluctuation in the power feed received at the facility. In another example, the power feed may become unstable such that it becomes unusable by the facility. In another example, an unexpected fluctuation in a power feed may damage downstream electrical equipment. In a further example, a power feed may fail altogether.

In many cases, a computing facility may include a backup power source that can temporarily supply backup power to the facility in the event that a power feed from an external power source is lost. For example, a facility may include a generator powered by a diesel engine, where the generator is activated if the primary utility power feed is lost. A computing facility can include an uninterruptible power source (UPS), such as a battery, which can provide an uninterruptible supply of power for a short period of time.

A backup generator can require time to be activated and readied to supply backup power, which may present difficulties for a facility where even a brief interruption of power can damage equipment or otherwise interrupt normal operations. Furthermore, a backup generator may be expensive to operate. For example, a diesel-fueled backup generator may consume significant amounts of diesel fuel over a period of time, and the generator may require additional maintenance to maintain a reliable backup capability. In addition, a UPS can be an expensive and bulky asset for a computing facility, and may need to be on-line continuously. Such a need for continuous activation of a UPS can drain facility resources by requiring additional maintenance and boosting a facility's power requirements through energy losses associated with the UPS.

Figure 1:
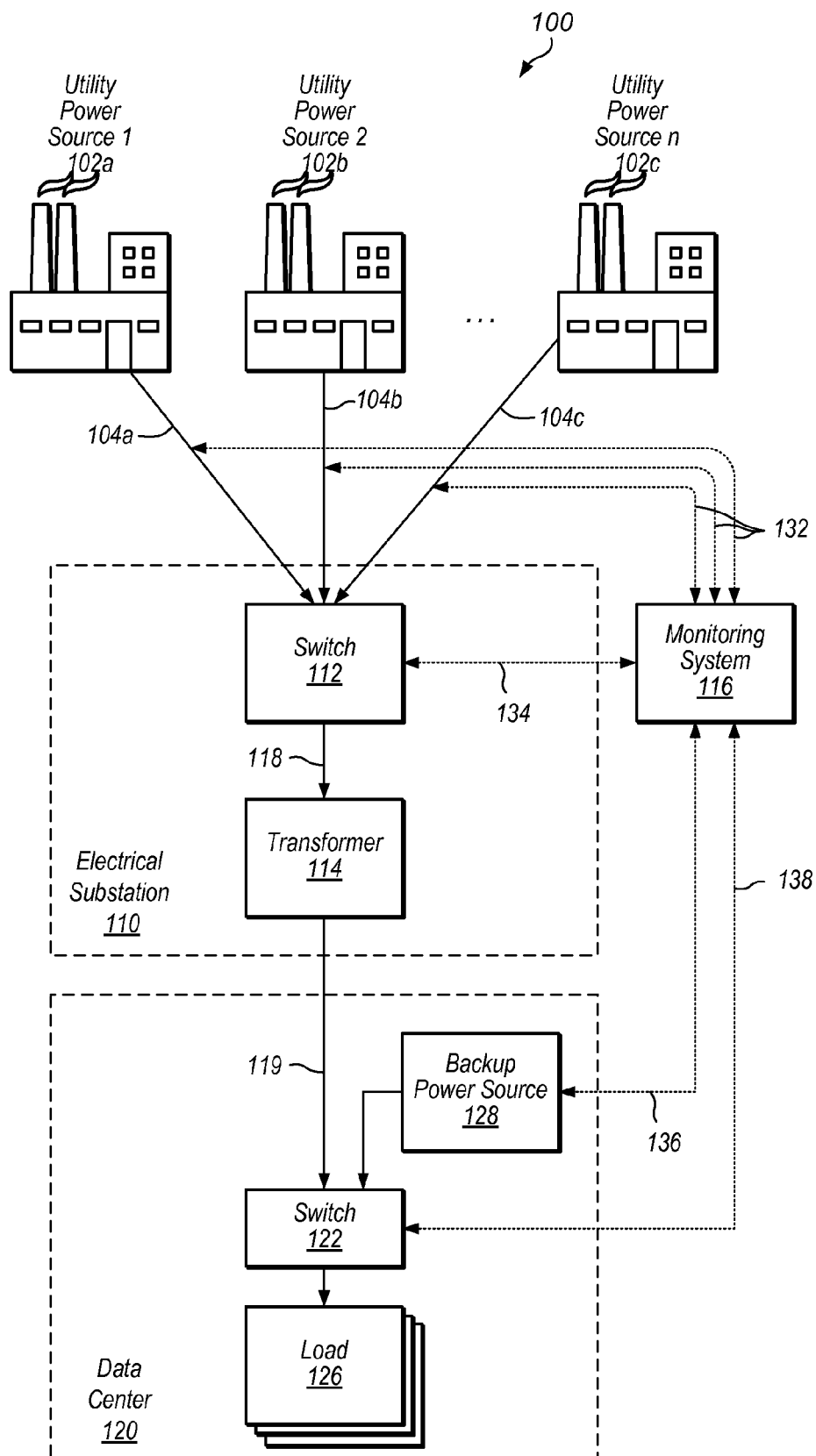
FIG. 1 is a block diagram illustrating one embodiment of a system that manages power provided to a load in a data center.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for managing power feeds to a load are disclosed. According to one embodiment, a system includes a data center that operates based on a supply of low-voltage power, an electrical substation electrically coupled to the data center, and a power waveform monitoring system. The electrical substation includes a transformer and a switching device. The transformer steps down high-voltage power into low-voltage power supplied to the data center, and the switching device selectively routes high-voltage power to the transformer from a primary utility power source or an alternate utility power source. The power waveform monitoring system monitors a waveform of high-voltage power received from the primary utility power source for a waveform pattern indicating potential interruption of high-voltage power received from the primary utility power source, and upon identifying the waveform pattern, directs the switching device to switch from routing high-voltage power from the primary utility power source to routing high-voltage power from the alternate utility power source.

According to one embodiment, a system includes a computing device including a waveform analysis module and a control module. The waveform analysis module identifies a waveform pattern of a first high-voltage power feed received at an electrical substation. The electrical substation transforms high-voltage power feeds to a low-voltage power output supplied to a low-voltage power load. Upon identification of the waveform pattern, the control module directs a part of the electrical substation to switch from transforming the first high-voltage power feed to transforming a second high-voltage power feed.

According to one embodiment, a method includes performing, by a computing device, determining potential interruption of a first high-voltage power feed based on monitoring a first waveform associated with the first high-voltage power feed and, upon determining the potential interruption, directing a switching device to switch from forwarding the first high-voltage power feed to forwarding an alternate power feed.

As used herein, a "cable" includes any cable, conduit, or line that carries one or more conductors and that is flexible over at least a portion of its length. A cable may include a connector portion, such as a plug, at one or more of its ends.

As used herein, "computing" includes any operations that can be performed by a computer, computing device or processor, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, one component in a power infrastructure is "downstream" from another component in the system if the one component receives power from the other component or is at a lower level in the system than the other component. For example, a floor power distribution unit (PDU) may be downstream from a UPS, or a data center may be downstream from a power plant.

As used herein, "load", includes the output of a power infrastructure and the electrical power consumed by some or all of the power infrastructure, including the output. For example, a load in a power infrastructure may include a computing facility that consumes power distributed over the power infrastructure from a power source.

As used herein, a "module" is a component or a combination of components. A module may include functional elements and systems, such as computer systems, circuit boards, racks, blowers, ducts, and power distribution units, as well as structural elements, such a base, frame, housing, or container.

As used herein, a "power feed" includes power from any source, including but not limited to power received from a utility power source that can be supplied to an electrical load. In some embodiments, a "power feed" may be received from the output of a transformer. For example, a low-voltage power feed received from a transformer may include low-voltage power received over a low-voltage power transmission line coupled to the transformer.

As used herein, "power transmission line" a line that transmits power from one component to another component. Examples of power transmission lines include conductors that carry power from a UPS to a floor PDU, conductors that carry power from a floor PDU to a rack PDU, and conductors that carry power from a rack PDU to a server power supply unit, and power lines. Power transmission lines may have any form, such as a cable, bus bar, or other conductive member or device.

As used herein, "power distribution unit" means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, and isolation.

As used herein, "floor power distribution unit" refers to a power distribution unit that can distribute electrical power to various components in a computer room. In some embodiments, a floor power distribution unit includes a transformer. In one embodiment, a floor power distribution unit includes a k-rated transformer. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers. In some embodiments, a rack power distribution unit may distribute power to only some of the electrical systems in a rack. In some embodiments, a single rack includes two or more rack power distribution units that distribute power to different sets of electrical systems in the rack. For example, one rack may include a left rack power distribution unit that distributes power to half of the servers in the rack, and a right rack power distribution unit that distributes power to the other half of the servers in the rack.

As used herein, a "rack" means a rack, container, frame, or other element or combination of elements that can contain or physically support one or more computing devices.

As used herein, "reserve power" and "backup power" may refer interchangeably to power that can be supplied to an electrical load upon the failure of, or as a substitute for, primary power to the load. For example, a power feed from a backup generator may include backup power.

As used herein, "signal" includes an electrical or electromagnetic impulse, wave, tone, pulse, or combination thereof. A signal may serve to indicate, identify, inform, direct, instruct, command, or warn. A signal may be a discrete set of information (for example, a sequence of characters in a message), continuous (such as a wave), periodic, or a combination thereof. A signal may have any of various regular or irregular characteristics. In some embodiments, a signal includes one or more repeating characteristics, such as a sine wave, a square wave, or a sawtooth wave. In some embodiments, a signal has non-repeating characteristics. A signal can be applied to, or transmitted through, a single conductor or to a set of two or more conductors. In some embodiments, a signal is an electromagnetic signal transmitted through air (for example, a wireless signal). In some embodiments, a signal has characteristics of another signal. For example, a circuit may include a current, produced by an instrument transformer, which is a reduced current that is proportional to a full current in another circuit by a known or predetermined factor, such that the reduced current in the first circuit can be used to determine the full current in the other circuit.

As used herein, "substation" or "electrical substation" includes a collection of one or more components that process power received from one or more power sources for distribution. In some embodiments, a substation includes transformers, switching devices, sensor equipment that generates data regarding received power, and switchgear. For example, an electrical substation that receives high-voltage power from two separate utility power sources may include a transformer that steps down the voltages to a medium voltage, switchgear to isolate power received from one or both of the power sources from downstream equipment, and sensor equipment that generate data regarding power received from one or both of the power sources.

As used herein, "switching device" or "switch" includes an electrical switch that can break an electrical current. A switching device can interrupt a power flow, divert one of the source or output of a power feed, etc. For example, a switching device may selectively route a power feed from one of two or more sources to a single output.

As used herein, "switchgear" includes electrical switching devices, fuses, circuit breakers, or combinations thereof used to isolate components in an electrical system. Switchgear can isolate downstream components from upstream power feeds. In some embodiments, switchgear isolates components to protect the equipment from electrical faults elsewhere in an electrical system. For example, switchgear in a computing facility may isolate various electrical and computing systems in the facility from upstream power feeds.

As used herein, one component in a system is "upstream" from another component in the system if the one component supplies power to the other component or is at a higher level in the system than the other component. For example, an electrical substation supplying power to a data center may be upstream from the data center, or a transformer may be upstream from a UPS.

As used herein, "low voltage" refers to voltages of less than about 1 kilovolt. For example, a low-voltage power supply may have a voltage of about 200 volts.

As used herein, "medium voltage" refers to voltages ranging between about 1 kilovolt and 35 kilovolts. For example, a power feed of medium voltage may have a voltage of about of about 13.8 kilovolts or 12.5 kilovolts at a frequency of about 60 Hz.

As used herein, "high voltage" refers to voltages exceeding about 35 kilovolts. For example, a high-voltage power feed may have a voltage of about 115 kilovolts.

As used herein, "waveform" means a signal having one or more periodic characteristics. A waveform may be, for example, a sine wave having a particular frequency and amplitude.

As used herein, "waveform pattern" means a characteristic or set of characteristics of a signal that can be used to identify the occurrence or potential occurrence of an event associated with power transmitted over a power transmission line or from a power source. For example, a waveform pattern may be used to detect that power received from a first power source is experiencing a disturbance. As another example, a waveform pattern may be used to detect that power received over a first power transmission line may potentially be interrupted or fail. A waveform pattern may be established from output signals sensed at one or more points in a system. A waveform pattern may have any of various distinguishing characteristics. In some embodiments, a waveform pattern has distinguishing harmonic characteristics, such as a waveform having a particular shape, frequency, and amplitude. A waveform pattern may include elements of a carrier wave (such as a power transmission wave supplying power to electrical systems) and one or more additional signals.

As used herein, "stepping", "step up", "step down", and the like refer to changing a voltage. For example, a transformer that increases a voltage of a power feed from a low voltage to a high voltage "steps up" the voltage of the power feed. In another example, a transformer that decreases a voltage of a power feed from a high voltage to a low voltage "steps down" the voltage of the power feed.

In various embodiments, a power infrastructure includes a power monitoring system that is coupled to one or more components in the power infrastructure and manages distribution of power from one or more power sources to a load based upon monitoring a waveform of one or more power feeds in the power infrastructure.

In some embodiments, the power infrastructure includes a data center, and the power monitoring system manages the supply of power to the data center to ensure an uninterrupted supply to the load of the data center, which can include some or all of the rack components in the data center. The power monitoring system can manage power supplied to the data center by monitoring waveforms of various power feeds in the power infrastructure to determine the quality of the power feeds, and controlling one or more components to ensure a steady supply of power to the data center load from one or more of the power feeds based upon the monitoring. In some embodiments, the power monitoring system monitors waveforms of high-voltage power feeds and manages power supply to the load by controlling which selected high-voltage power feed is used to supply power to the data center. The power monitoring system may switch between routing a high-voltage feed and routing a lower voltage power feed, including one or more moderate-voltage and low-voltage power feeds, to the data center.

FIG. 1 is a block diagram illustrating one embodiment of a system that manages power provided to a load in a data center. The system 100, which can be included in a power infrastructure, includes one or more power sources 102a, 102b, 102c, electrical substation 110, a data center 120, and a power monitoring system 116.

In some embodiments, one or more of electrical substation 110, data center 120 208, and power monitoring system 116 are part of a common facility, are controlled by a common entity, or some combination thereof. For example, electrical substation 110, monitoring system 116, and data center 120 may be located in the same facility and be part of a common entity distinct from a power utility entity.

For illustrative purposes, three power sources 102a, 102b, 102c are shown in FIG. 1. The number of power sources may, however, vary from embodiment to embodiment (and, within a given embodiment, from system to system). In addition, the number of any of the illustrated elements in FIG. 1 may vary from embodiment to embodiment (and, within a given embodiment, from system to system). For example, in some embodiments, electrical substation 110 may include multiple switching devices 112 and multiple transformers 114.

In some embodiments, the power sources 102a, 102b, 102c include one or more utility power sources, including one or more power plants. For example, in the illustrated embodiment, each of power sources 102a, 102b, and 102c is a utility power source that generates power through utilization of one or more separate power plants.

Electrical substation 110 includes a switching device 112 and a transformer 114. Electrical substation 110 may provide power received from a power source over one or more power transmission lines 104a, 104b, 104c to data center 120 over power transmission line 119.

In some embodiments, electrical substation 110 steps down the voltage of power received from a power source to a voltage for distribution to a load. For example, high-voltage power may be received at electrical substation 110 from one or more power utilities 102a, 102b, 102c over one or more high-voltage power transmission lines 104a, 104b, 104c and stepped down by the transformer 114 to a lower voltage for distribution to data center 120 over a low-voltage power transmission line 119. The data center may not be capable of accepting high-voltage power, or the power transmission line 119 coupling the electrical substation 110 and the data center 120 may not be capable of carrying high-voltage power.

In some embodiments, transformer 114 steps down voltage of a received power feed to a low voltage, such that an output power feed from the transformer to the data center over power transmission line 119 is low-voltage power. In some embodiments, transformer 114 steps down voltage of the received power feed to a medium voltage and transmits the moderate-voltage power output to another transformer (not shown in FIG. 1) to be stepped down further to a low voltage. For example, power transmission line 119 may distribute moderate-voltage power, and one or more additional transformers located proximate to, or as part of, the data center may step down moderate-voltage power to a specific low-voltage power required by the data center load 126. In some embodiments, the additional transformer is a distribution transformer.

In some embodiments, power received at electrical substation 110 over one or more power transmission lines 104a, 104b, 104c can be selectively routed to be provided to the data center 120 by one or more switching devices 112. Switching device 112 can isolate one or more power feeds from components downstream of the switching device 112 and allow only power from one or more selected power sources to be passed to transformer 114 over power transmission line 118. For example, in the illustrated embodiment, switching device 112 may switch between selectively routing power received over one of power transmission lines 104a, 104b, and 104c to transformer 114 to be stepped down to a low voltage and transmitted to data center 120 over power transmission line 119.

In some embodiments, switching device 112 is a high-voltage switching device that switches between one or more received high-voltage power feeds. For example, switching device 112 may be a high-voltage switching device including one or more circuit breakers, switchgear, etc. that selectively routes one or more high-voltage power feeds by switching between the high-voltage power feeds. In some embodiments, the high-voltage switching device 112 can switch between high-voltage power feeds without affecting the supply of power to the data center load 126. For example, where a data center load 126 includes computing systems, even brief power interruptions can disrupt normal operations of some or all of the data center 120. In such an example, switching device 112 may include a high-voltage switching device that can switch between high-voltage power feeds within about 0.5 to 0.8 seconds or within about 30 to 50 cycles in a 60 Hz power feed, which may be a sufficiently fast switching speed to ensure that the data center load 126 is not affected by the switching.

In some embodiments, such as where a high-voltage switching device 112 is a "high-speed" switching device that can switch between high-voltage power feeds sufficiently quickly to avoid affecting operations of computing systems in the data center load 126, the data center 120 may not require an uninterruptible power source (UPS) to provide reasonable security against power interruptions affecting the load 126. Such a configuration may have a positive effect on the data center's 120 power utilization effectiveness (PUE).

Power monitoring system 116 is coupled to at least a part of electrical substation 110 and data center 120 and manages the supply of power to the data center load 126 by monitoring one or more waveforms of one or more power feeds to the electrical substation 110 and controlling which power feeds are supplied to the data center load 126 based on the monitoring. In some embodiments, power monitoring system 116 is coupled to one or more components in system 100. For example, in the illustrated embodiment, power monitoring system 116 is coupled to power transmission lines 104a, 140b, and 104c by way of lines 132, switching device 112 by way of line 134, backup power source 128 by way of line 136, and switching device 112 by way of line 138. Lines 132, 134, 136, and 138 may each be, in various embodiments, a cable, an electrical bus, or a combination thereof. In some embodiments, one or more of lines 132, 134, 136, and 138 include a wireless connection between power monitoring system 116 and the coupled component. For example, power monitoring system may be remotely located from both the electrical substation 110 and the data center 120 and coupled to components in each by way of one or more wireless connections.

In some embodiments, power monitoring system 116 is coupled to one or more sensor devices (not shown in FIG. 1) that are themselves coupled to one or more power transmission lines 104a, 104b, 104c. For example, in the illustrated embodiment, power monitoring system 116 may be coupled to one or more sensor devices (not shown in FIG. 1) by way of lines 132, where the sensor devices are coupled to one or more power transmission lines 104a, 104b, 104c carrying the power feed. In some embodiments, one or more of the sensor devices are located within electrical substation 110.

In some embodiments, the sensor devices are high-voltage instruments that provide data regarding one or more high-voltage power feeds. Such data can include one or more signals that include characteristics associated with the power feed. For example, sensor devices can include instruments including one or more of a current transformer and a potential transformer that can provide data indicating respective measurements of the current and voltage of a high-voltage power feed. In some embodiments, data generated by a sensor device includes a signal having characteristics that are proportional to characteristics of a power feed by a known factor, such that the data can be used to determine characteristics of the power feed.

In some embodiments, power monitoring system 116 manages which high-voltage power feed is selectively routed by switching device 112 based on monitoring a waveform of high-voltage power received over one or more of the high-voltage power transmission lines 104a, 104b, 104c. For example, the power monitoring system 116 may use data collected over lines 132 to monitor a high-voltage power feed being received over power transmission line 104a and routed by switching device 112 to the transformer 114 by monitoring a waveform of the high-voltage power feed and determining, based at least in part on monitoring the waveform, characteristics of the high-voltage power feed and further determining whether to switch from routing the high-voltage power feed to data center load 126 to routing another power feed to data center load 126.

In some embodiments, the data collected by the power monitoring system 116 represents the power feed as a waveform. A power feed may appear as a modulation of a sinusoidal wave (for example, a 60 Hertz sinusoidal wave). In some embodiments, a power feed is a waveform at a defined frequency and amplitude. For example, power monitoring system 116 may collect voltage data associated with high-voltage power received over power transmission line 104a that represents the variation of voltage in the power transmission line 104a over time as a waveform.

The power monitoring system 116 may direct components in system 100 to switch the source of power to data center load 126 from a first high-voltage power source to a second high-voltage power source. In some embodiments, the power monitoring system 116 monitors waveforms of one or more high-voltage power feeds received from one or more high-voltage power sources 102a, 102b, 102c and, based on the monitoring, directs switching device 112 to switch between two or more high-voltage power feeds. In some embodiments, power monitoring system 116 directs switching from a first high-voltage power feed to a second high-voltage power feed upon determining that the first high-voltage power feed may potentially be interrupted. By directing switching between power feeds before the potential power interruption occurs, power monitoring system 116 enables a steady, uninterrupted supply of high-voltage power to transformer 114 and thus a steady, uninterrupted supply of power to data center load 126, thereby preventing power interruptions at the data center load 126.

The power monitoring system 116 may direct components in system 100 to switch the source of power to data center load 126 from a high-voltage power source to a low-voltage power source. In some embodiments, the power monitoring system 116 monitors waveforms of one or more high-voltage power feeds from one or more high-voltage power sources 102a, 102b, 102c and, based on the monitoring, directs switching device 122 to switch between a low-voltage power feed over power transmission line 119 and a backup power feed provided by backup power source 128. A backup power source 128 can include one or more generators, batteries, and other known power sources and may be located locally to the data center, remotely from the data center, or some combination thereof. For example, the backup power source may include an on-site diesel generator.

In some embodiments, power monitoring system 116 directs switching to the backup power source 128 upon determining that a high-voltage power feed may potentially be interrupted and no other high-voltage power feeds are available to be switched to by switching device 112. The monitoring power system 116 may direct switching back to a high-voltage power feed upon determining that one or more high-voltage power feeds are stable. For example, power monitoring system 116 may continuously monitor waveforms from each high-voltage power feed received over power transmission lines 104a, 104b, 104c, even if one or more of the high-power feeds is not being routed to the transformer 144 by switching device 112, and switch between high-voltage power feeds and the backup power feed based upon waveforms in one or more of the high-voltage power feeds.

In some embodiments, power monitoring system 116 directs switching to the backup power source 128 even if one or more high-voltage power feeds are available and stable. For example, the available and stable high-voltage power feeds may include undesirable characteristics, including unfavorable usage costs, known historical tendencies to become unstable on short notice, etc., such that the power monitoring system 116 may determine that the backup power source 128 provides a more stable and efficient supply of power to data center load 126.

In some embodiments, based on waveform pattern recognition on one or more of power feeds 104, power monitoring system 116 may activate a backup power source 128 and maintain it at a standby state for a predetermined period of time. Standby activation may be used to prepare the backup power source 128 for availability as a safeguard in the event that power must be switched to the backup power source 128 without interrupting the data center load 126. For example, where high-voltage power feeds over power transmission lines 104b and 104c are interrupted, such that no alternate high-voltage power feeds apart from the power feed over power transmission line 104a is available for switching in the event the power feed over line 104a is interrupted, power monitoring system may direct some or all of backup power source 128 to be activated and brought to a standby state so that, if a power interruption event in the power feed over line 104a is anticipated based on waveform monitoring, the power supply can be switched to the backup power feed without having to wait for the backup power source 128 to initialize and complete a start-up process.

In some embodiments, power monitoring system 116 activates a backup power source 128 and maintains it in a standby state for a predetermined period of time in response to detecting a power disturbance event in a high-voltage power feed that, while indicating disturbance in the power feed, does not indicate interruption of the power feed. The predetermined amount of time may be determined, in part or in full, by the specific nature of the detected disturbance event such that, after an elapse of the predetermined amount of time, the power monitoring system 116 can determine with a certain level of confidence that the high-voltage power feed in which the disturbance was detected is not potentially at risk of being interrupted. For example, where the power disturbance event is a power feed fluctuation caused by a lightning strike, the predetermined amount of time may last only a few minutes. Upon the elapse of the predetermined amount of time, the power monitoring system may direct the backup power source 128 to deactivate, thereby conserving backup power resources.

The power monitoring system 116 may monitor the backup power source 128 to track the availability of backup power. For example, where the backup power source 128 includes a diesel generator, the power monitoring system may monitor how much diesel fuel is available in the generator's fuel tanks.

Figure 2:
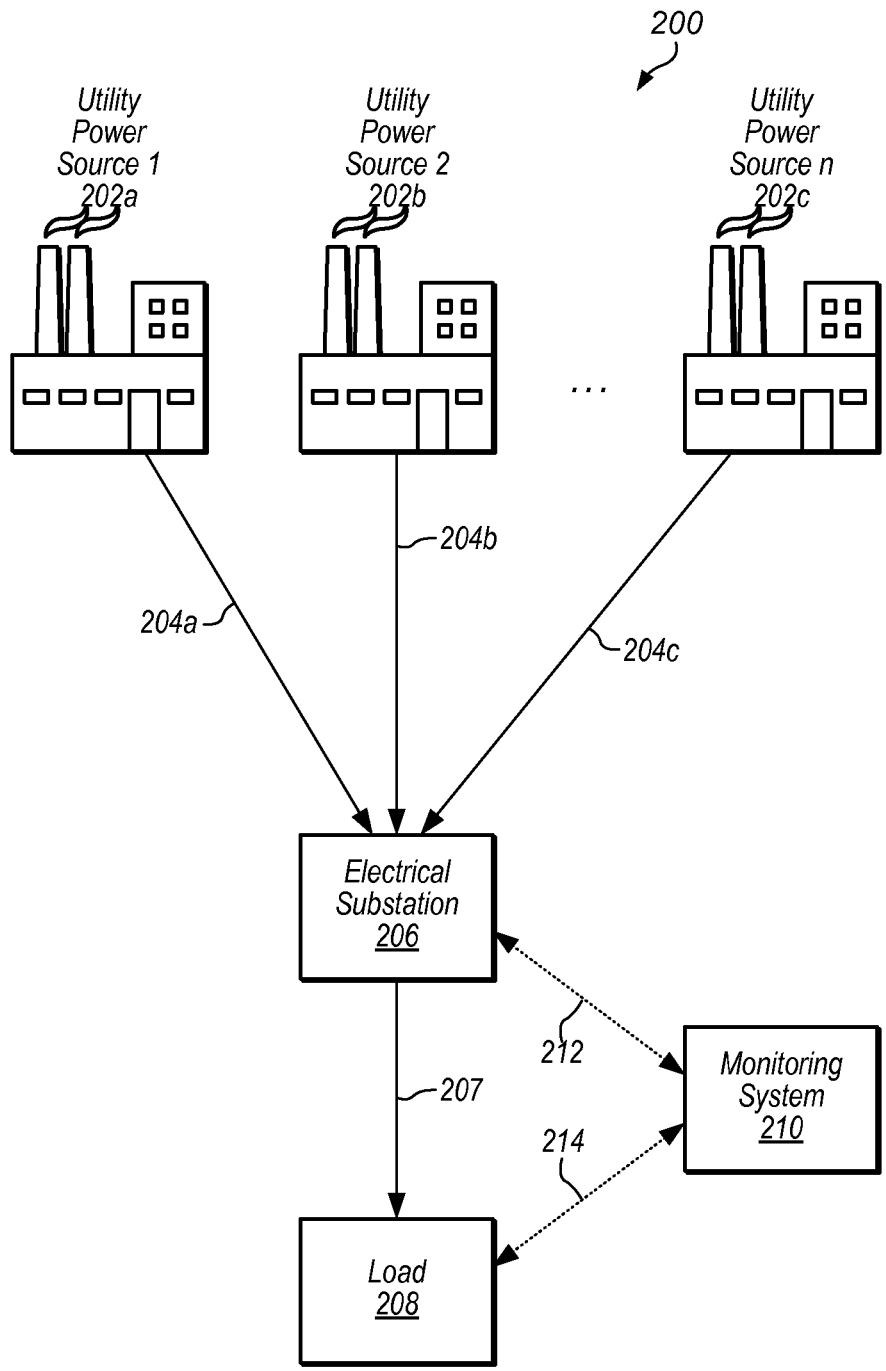
FIG. 2 is a block diagram illustrating one embodiment of a system that manages power provided to a load.

FIG. 2 is a block diagram illustrating one embodiment of a system that manages power provided to a load. The system 200, which can be included in a power infrastructure, includes one or more power sources 202a, 202b, 202c, electrical substation 206, a load 208, and a power monitoring system 210.

For illustrative purposes, three power sources 202a, 202b, 202c are shown in FIG. 2. The number of power sources may, however, vary from embodiment to embodiment (and, within a given embodiment, from system to system). For example, an embodiment of the electrical substation may connect to only two different utility power sources. In addition, the number of any of the illustrated elements in FIG. 2 may vary from embodiment to embodiment (and, within a given embodiment, from system to system).

Power is provided ("distributed") to the load 208 from one or more of the power sources 202a, 202b, 202c and is routed through electrical substation 206. Electrical substation 206 receives power feeds from power sources 202a, 202b, 202c over respective power transmission lines 204a, 204b, 204c and provides a power feed to load 208 over power transmission line 207. In some embodiments, one or more of power transmission lines 204a, 204b, 204c are high-voltage power transmission lines carrying high-voltage power and power transmission line 207 is a low-voltage power transmission line carrying low-voltage power. For example, electrical substation 206 may include one or more transformers that step down received high-voltage power to provide lower voltage power, which can include moderate-voltage power, low-voltage power, or some combination thereof.

In some embodiments, power monitoring system 210 is coupled to at least a part of one or more of electrical substation 206 and load 208. For example, in the illustrated embodiment, power monitoring system 210 is coupled to at least a part of electrical substation 206 by way of line 212 and load 208 by way of line 214. Lines 212 and 214 may each be, in various embodiments, a cable, an electrical bus, or a combination thereof. In some embodiments, one or more of lines 132, 134, 136, and 138 include a wireless connection between power monitoring system 116 and the coupled component. In some embodiments, the power monitoring system communicates with one or more components by way of the lines. For example, power monitoring system 210 may use one or more lines 212 to receive power feed data for waveform monitoring from one or more sensor devices in electrical substation 206 and to direct one or more switching devices in the electrical substation 206. In another example, power monitoring system may use one or more lines 214 to receive data regarding power consumption at the load 208, information regarding one or more reserve power systems, and to direct one or more switching devices in load 208.

Power monitoring system 210 manages power provided to load 208 by monitoring one or more power feeds provided to electrical substation 206 and directing one or more components in system 200 to selectively route power from one or more power sources to load 208 based on determinations made based on the monitoring. In some embodiments, one or more of electrical substation 206, load 208, and power monitoring system 210 are part of a common facility, are controlled by a common entity, or some combination thereof. For example, electrical substation 206 and load 208 may be located in the same facility. In another example, where load 208 is included in a computing facility, power monitoring system 210 may also be included in the computing facility, such that at least a part of the electrical substation 206 is controlled by power monitoring system 210 from the computing facility.

In some embodiments, where one or more power feeds received at electrical substation 206 over power transmission lines 204a, 204b, 204c are high-voltage power feeds, power monitoring system 210 directs at least a part of electrical substation 206 to switch between routing one or more of the high-voltage power feeds to load 208 over power transmission line 207, based on monitoring of one or more of the high-voltage power feeds by power monitoring system 210.

In some embodiments, selectively routing a power feed includes switching between one or more of the power feeds provided to electrical substation over power transmission lines 204a, 204b, 204c. In some embodiments, selectively routing a power feed includes routing power from a power source coupled to the load independently of electrical substation 206. Such a power source may be part of the load. For example, power monitoring system 210 may route power to the load 208 from a reserve power system included in the load 208. In some embodiments, the power source is included in one or more of the electrical substation 206 and power monitoring system 210.

In some embodiments, selectively routing a power feed includes directing a component to selectively route the power feed. For example, in the illustrated embodiment, power monitoring system 210 may selectively route power from one of the power sources 202a, 202b, 202c to load 208 by directing a part of electrical substation 206 to selectively route the power. Selective routing by a component may involve a switching device switching between selectively routing one or more power feeds. In some embodiments, a switching device includes one or more switches, fuses, circuit breakers, switchgear, or some combination thereof. A switching device may selectively route one or more power feeds by isolating one or more upstream power feeds received over one or more upstream lines from one or more downstream lines while routing a selectively routed power feed received over an upstream line through the downstream line.

In some embodiments, system 200 includes one or more switching devices located in one or both of electrical substation 206 and load 208. For example, electrical substation 206 may include a high-voltage switching device that selectively routes high-voltage power to load 208 over power transmission line 207 from one or more of power transmission lines 204a, 204b, 204c. Such a switching device may, in some embodiments, route the selectively routed high-voltage power to a transformer such that power carried over one or more power transmission lines 207 to load 208 is of one or more lower voltages, which may include moderate-voltage power, low-voltage power, or some combination thereof. In some embodiments, load 208 includes one or more switching devices that selectively route power to one or more components in the load 208 from one or more sources, which may include power received from over one or more power transmission lines 207, power received from a reserve power source, or some combination thereof.

In some embodiments, power monitoring system 210 is coupled to one or more switching devices and directs the switching devices to selectively route power. For example, in the illustrated embodiments, power monitoring system may be coupled to a switching device in electrical substation 206 by way of line 212 and a switching device in load 208 by way of line 214.

In some embodiments, management by power monitoring system 210 of power supplied to load 208 includes monitoring a waveform of one or more of the power feeds and selectively routing a power feed to the load based upon determinations made from the monitoring. In some embodiments, monitoring a waveform includes monitoring for one or more waveform patterns indicating one or more particular power events and, upon detecting a waveform pattern, determining that the one or more particular power events may potentially occur in the power feed. The power monitoring system 210 may monitor a waveform of a power feed based on data associated with the power feed. Such data may be collected by the power monitoring system 210 from one or more sensor devices. For example, power monitoring system 210 may collect data associated with power received over one or more of power transmission lines 204a, 204b, and 204c from one or more sensor devices located in electrical substation 206, where power monitoring system 210 is coupled to the sensor devices by way of line 212. In some embodiments, the sensor devices may be located externally to one or more of electrical substation 206, load 208, and power monitoring system 210.

In some embodiments, power monitoring system 210 responds to determining that a particular power event may potentially occur in a power feed by selectively routing one or more power feeds. For example, where power received over power transmission line 204a is being routed to load 208 over power transmission line 207, and power monitoring system 210 detects a particular waveform pattern in the power received over power transmission line 204, power monitoring system 210 may direct a part of electrical substation 206 to switch from routing power from power transmission line 204a to routing power from power transmission line 204b.

In some embodiments, power monitoring system 210 may continuously monitor waveforms of some or all power feeds received at electrical substation 206 and continuously direct at least a part of electrical substation 206 to selectively route one or more of the power feeds based upon the monitoring. For example, power monitoring system 210 may direct a part of electrical substation 206 to switch between routing a first power feed from power source 202a to routing a second power feed from power source 202b in response to determining that a quality of power received from power source 202b is higher than power received from power source 202a. Such a determination may include designating a power feed with the highest determined power quality as a designated primary power feed, a designated preferred alternate power feed if the primary power feed may potentially be interrupted, etc.

In another example, power monitoring system 210 may direct a part of electrical substation 206 to switch between routing the first power feed from power source 202a to routing a third power feed from power source 202c in response to detecting a waveform pattern indicating a first power event in the waveform of the first power feed and concurrently or previously detecting a second power event in the waveform of the second power feed. Subsequently, the power monitoring system may direct a part of electrical substation 206 to switch between routing the third power feed from power source 202c to routing the first power feed from power source 202c in response to detecting a third waveform pattern in the waveform of the first power feed.

In some embodiments, one or more of the power feeds are ranked in terms of preference, such that the power monitoring system 210 may preferentially selectively route the highest-ranking stable power feed. For example, power monitoring system 210 may direct a part of electrical substation 206 to switch between routing the first power feed from power source 202a to routing a third power feed from power source 202c in response to detecting a waveform pattern indicating a first power event in the waveform of the first power feed, where the third power feed is a higher-ranking power feed than a second power feed from power source 202b. Rankings may be predetermined. In some embodiments, rankings of power feeds are developed by the power monitoring system 210 and revised over time continuously, intermittently, periodically, etc., such that a highest-ranking power feed may change over time based upon monitoring of the power feeds by power monitoring system 210.

In some embodiments, by directing a part of electrical substation 206 to switch between power feeds in response to determining a potential power event in a power feed, power monitoring system 210 prevents interruptions of power provided to the load 208. For example, where power received from power source 202a is selectively routed at electrical substation 206 to load 208, and power monitoring system 210 determines, based upon monitoring a waveform of the power received from power source 202a, that the power may potentially be interrupted and directs a part of electrical substation 206 to switch to routing power received from power source 202b to the load 208 before the potential power interruption occurs, the supply of power to load 208 is not interrupted by the potential power interruption, and a steady, uninterrupted supply of high-voltage power is maintained.

Figure 3:
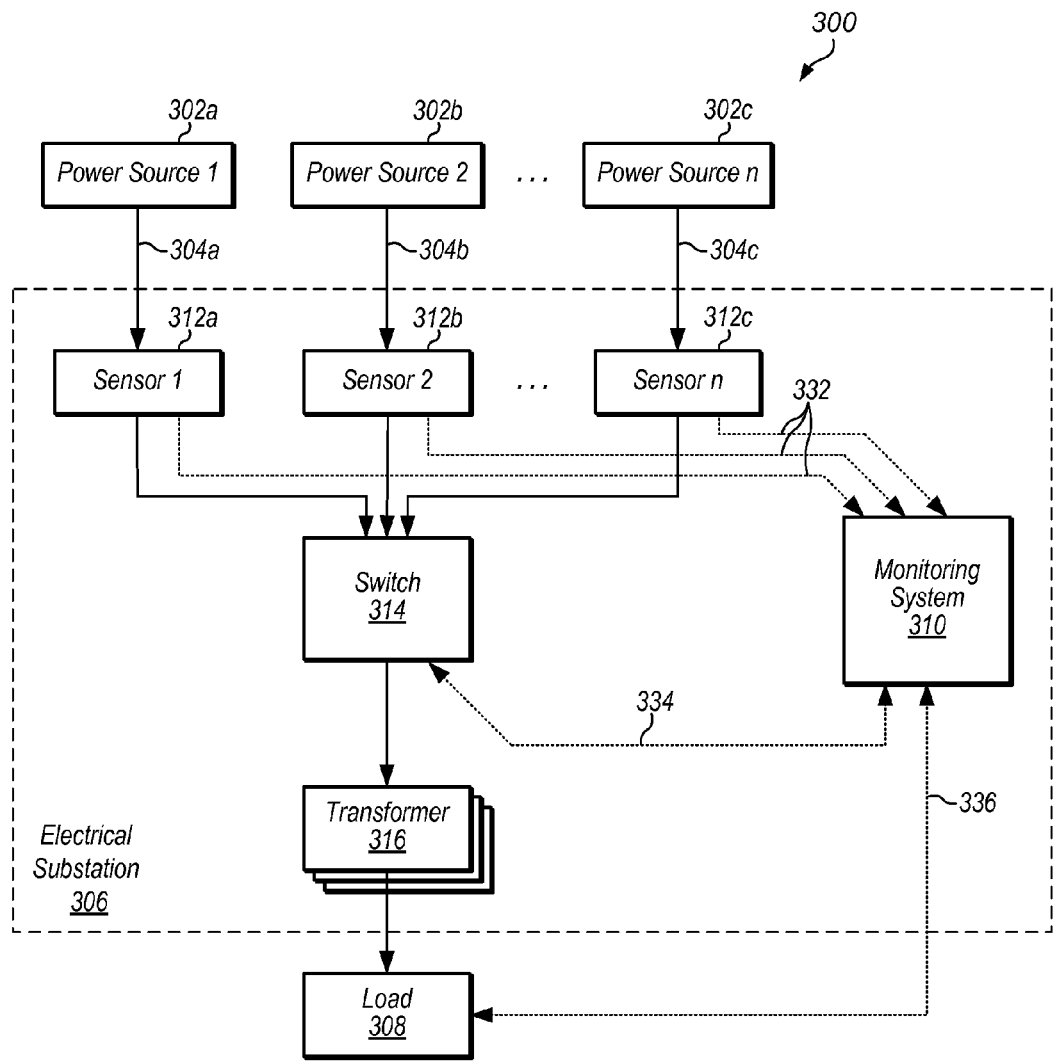
FIG. 3 illustrates one embodiment of a system that includes an electrical substation including a power monitoring system managing power supplied to a load from various power sources.

FIG. 3 illustrates one embodiment of a system that includes an electrical substation including a power monitoring system managing power supplied to a load from various power sources. System 300 includes electrical substation 306, power sources 302a, 302b, 302c, and load 308.

For illustrative purposes, three power sources 102a, 102b, 102c, and three sensor devices 312a, 312b, 312c are shown in FIG. 3. The number of power sources and sensor devices may, however, vary from embodiment to embodiment (and, within a given embodiment, from system to system). In addition, the number of any of the illustrated elements in FIG. 3 may vary from embodiment to embodiment (and, within a given embodiment, from system to system). For example, in some embodiments, electrical substation 306 may include multiple switching devices 314 and multiple transformers 316.

Electrical substation 306 includes sensor devices 312a, 312b, 312c, one or more switching devices 314, one or more transformers 316, and power monitoring system 310.

In some embodiments, power monitoring system 310 is coupled to one or more of the components in electrical substation 306. For example, in the illustrated embodiments, power monitoring system 310 is coupled to sensors 312a, 312b, 312c by way of lines 332 and one or more switching devices 314 by way of line 334. In some embodiments, power monitoring system may be coupled to one or more elements external to the electrical substation 306. For example, in the illustrated embodiment, power monitoring system 310 is coupled to at least a part of load 308 by way of line 336.

Power monitoring system 310 may use the lines to interact with some or all of the coupled elements. For example, power monitoring system 310 may use lines 332 to receive data associated with the power feeds from power sources 302a, 302b, and 302c from sensor devices 312a, 312b, 312c, respectively. In another example, power monitoring system 310 may use line 334 to direct one or more switching devices 314 to selectively route power received over one or more of power transmission lines 304a, 304b, and 304c to transformer 316. In another example, power monitoring system 310 may use line 336 to receive data regarding power consumption at the load 308, information regarding one or more reserve power systems, and to direct one or more switching devices in load 308.

In some embodiments, one or more switching devices 314 include one or more high-voltage switching devices that selectively route high-voltage power received over one or more power transmission lines 304a, 304b, 304c to transformer 316 to be stepped down to a lower voltage. For example, a switching device 314 may be a high-voltage switching device that selectively routes high-voltage power received over one of power transmission lines 304a and 304b to a transformer 316 that steps down the voltage and outputs low-voltage power to load 308. The high-voltage switching device 314 may include one or more circuit breakers, switchgear, etc. that selectively route one or more high-voltage power feeds by switching between the high-voltage power feeds. In some embodiments, the high-voltage switching device 314 can switch between routing one or more high-voltage power feeds without affecting the load 308. For example, where load 308 includes computing systems, even brief power interruptions can disrupt normal operations of the load 308. In such an example, a high-voltage switching device 314 may include a high-voltage switching device that can switch between high-voltage power feeds within about 0.5 to 0.8 seconds, which may be a sufficiently fast switching speed to ensure that the load 308 is not affected by the switching.

In some embodiments, such as where one or more high-voltage switching devices 314 are "high-speed" switching devices that can switch between high-voltage power feeds sufficiently quickly to avoid affecting operations of computing systems in the load 308, the load 308 may not require an uninterruptible power source (UPS) to provide reasonable security against power interruptions affecting the load 308.

In some embodiments, power monitoring system 310 monitors a waveform of each of one or more of the power feeds received by electrical substation 206 and, based on the monitoring, determines which power feeds to selectively route to the load 308 through the transformer 316. The power monitoring system 310 may make such determinations by monitoring waveforms for one or more particular waveform patterns that the power monitoring system 310 associates with one or more particular power events, such that detecting a particular waveform pattern in a waveform of a power feed is interpreted by the power monitoring system 310 as an indication that a particular power event associated with the waveform pattern may potentially occur in the monitored power feed.

Figure 4:
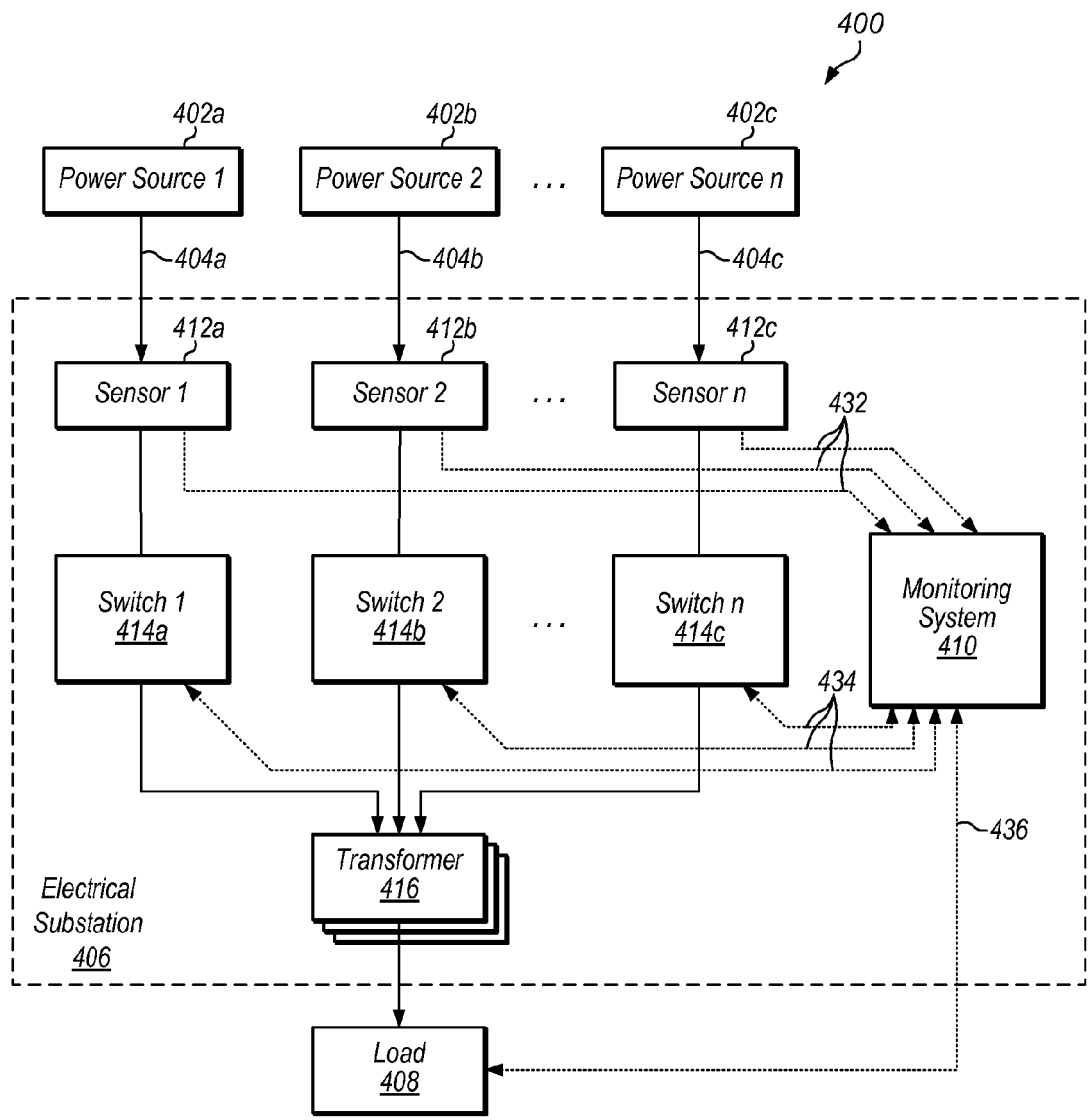
FIG. 4 illustrates one embodiment of a system including an electrical substation including a power monitoring system managing power supplied to a load from various power sources.

FIG. 4 illustrates one embodiment of a system including an electrical substation including a power monitoring system managing power supplied to a load from various power sources. System 400 includes electrical substation 406, power sources 402a, 402b, 402c, and load 408.

Electrical substation 406 includes sensor devices 412a, 412b, 412c, switching devices 414a, 414b, 414c, one or more transformers 416, and power monitoring system 410.

For illustrative purposes, three power sources 402a, 402b, 402c, three sensor devices 412a, 412b, 412c, and three switching devices 14a, 414b, 414c are shown in FIG. 4. The number of power sources, sensor devices, and switching devices may, however, vary from embodiment to embodiment (and, within a given embodiment, from system to system). In addition, the number of any of the illustrated elements in FIG. 4 may vary from embodiment to embodiment (and, within a given embodiment, from system to system).

In some embodiments, power monitoring system 410 is coupled to one or more of the components in electrical substation 406. For example, in the illustrated embodiments, power monitoring system 410 is coupled to sensors 412a, 412b, 412c by way of lines 432 and switching devices 414a, 414b, 414c by way of lines 434. In some embodiments, power monitoring system 410 may be coupled to one or more elements external to the electrical substation 406. For example, in the illustrated embodiment, power monitoring system 410 is coupled to at least a part of load 408 by way of line 436.

Power monitoring system 410 may use the lines to interact with some or all of the coupled elements. For example, power monitoring system 410 may use lines 432 to receive data associated with the power feeds from power sources 402a, 402b, and 402c from sensor devices 412a, 412b, 412c, respectively. In another example, power monitoring system 410 may use lines 334 to direct one or more of switching devices 414a, 414b, 414c to selectively route power received over one or more of power transmission lines 404a, 404b, 404c to one or more transformers 416. In another example, power monitoring system 410 may use line 436 to receive data regarding power consumption at the load 408, information regarding one or more reserve power systems, and to direct one or more switching devices in load 408.

In some embodiments, the switching devices 414a, 414b, 414c include one or more high-voltage switching devices that can be collectively controlled by power monitoring system 410 to selectively route high-voltage power received over one or more power transmission lines 404a, 404b, 404c to one or more transformers 416 to be stepped down to a lower voltage. For example, one or more of the switching devices 414a, 414b, 414c may be a high-voltage switching device that includes one or more circuit breakers, switchgear, etc. that selectively routes high-voltage power received over a respective one of power transmission lines 404a, 404b, 404c by isolating the respective power transmission line from downstream power transmission lines, such as a power transmission line to a transformer 316. In such an example, power monitoring system 410 may collectively control the switching devices 414a, 414b, 414c to selectively route a first power feed received over power transmission line 404a to a transformer 416 by closing switching device 414a to route the first power feed to the transformer and opening switching devices 414b and 414c, such that power transmission lines 404b and 404c are respectively isolated from power transmission lines downstream of switching devices 414b and 414c. In some embodiments, a high-voltage switching device can switch between an open state that isolates a power feed and a closed state that routes a power feed within about 0.5 to 0.8 seconds, which may be a sufficiently fast switching speed to ensure that the load 408 is not affected by the switching.

In some embodiments, such as where one or more high-voltage switching devices 414a, 414b, 414c are "high-speed" switching devices that can switch between open states and closed states sufficiently quickly to avoid affecting operations of computing systems in the load 408, the load 408 may not require an uninterruptible power source (UPS) to provide reasonable security against power interruptions affecting the load 408.

In some embodiments, power monitoring system 410 monitors a waveform of each of one or more of the power feeds received by electrical substation 406 and, based on the monitoring, determines which power feeds to selectively route to the load 408 through one or more transformers 416. The power monitoring system 410 may make such determinations by monitoring waveforms for one or more particular waveform patterns that the power monitoring system 410 associates with one or more particular power events, such that detecting a particular waveform pattern in a waveform of a power feed is interpreted by the power monitoring system 410 as an indication that a particular power event associated with the waveform pattern may potentially occur in the monitored power feed.

Figure 5:
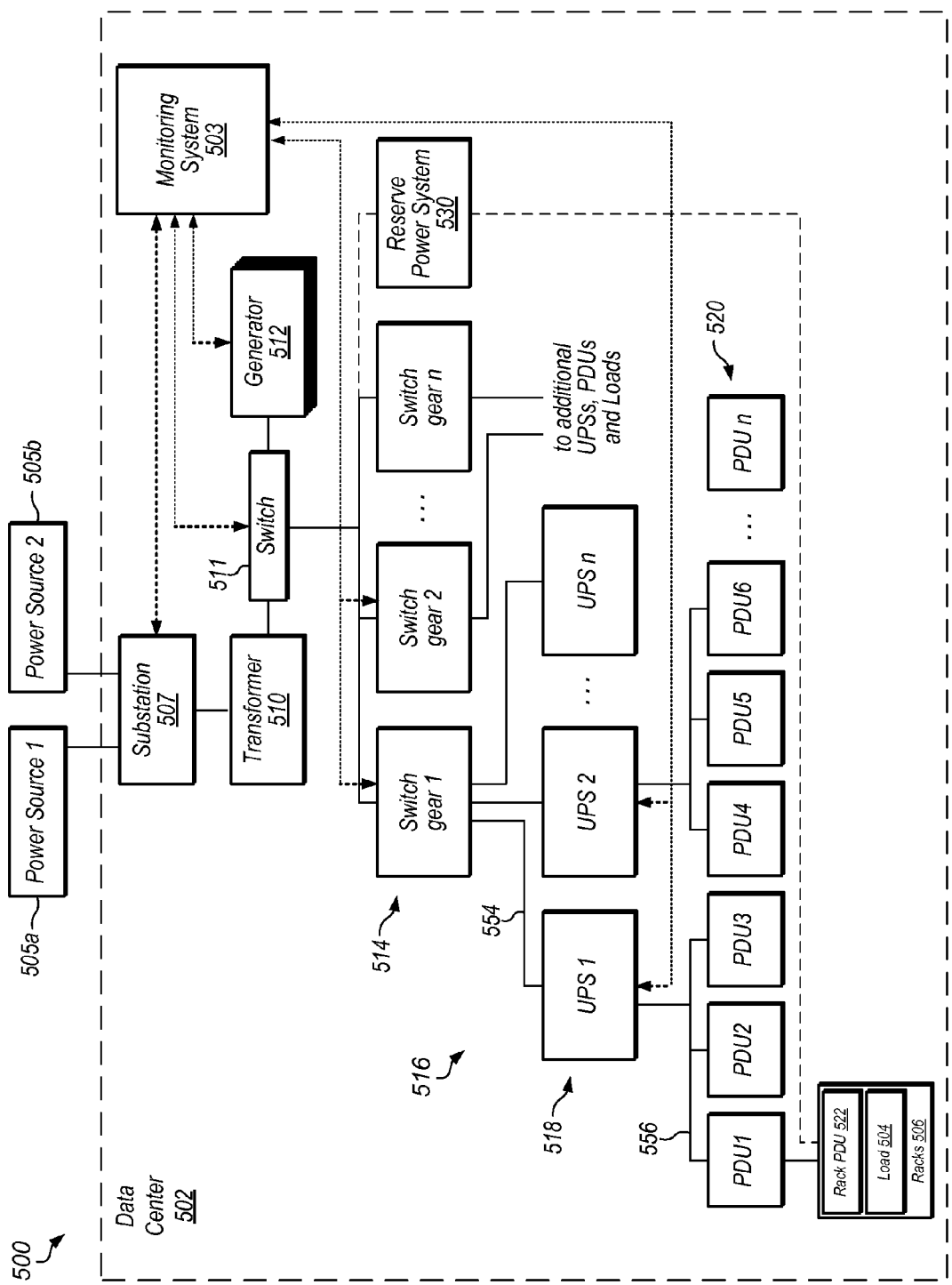
FIG. 5 illustrates one embodiment of a system including a data center including a power monitoring system managing power supplied to a load in the data center from various power sources.

FIG. 5 illustrates one embodiment of a system including a data center including a power monitoring system managing power supplied to a load in the data center from various power sources. System 500 includes data center 502 and power sources 505a, 505b.

Data center 502 includes electrical load 504. Electrical load 504 may include, for example, computing devices, rack-mounted servers, network control devices, power supply units, air moving devices, and mass storage devices. Electrical load 504 may be supported in racks 506. Electrical load 504 may perform various functions in the data center 502, including data storage or network services. In some embodiments, computing devices 504 are servers in a server room of data center 502.

Data center 502 includes electrical substation 507. Electrical substation 507 can route power feeds received from one or more power sources 505a, 505b to the electrical load 504. In some embodiments, a power feed received at electrical substation 507 may be a moderate-voltage power feed. For example, the power feed received from power source 505a may be at a voltage of about 13.8 kilovolts or 12.5 kilovolts at a frequency of about 60 Hz. In some embodiments, a power feed received at electrical substation 507 may be a high-voltage feed. For example, the power feed received from one or more power sources 505a, 505b may be at a voltage of about 115 kilovolts. The electrical substation 507 may include a transformer that steps down the voltage of one or more power feeds to a medium voltage or a low voltage.

In some embodiments, electrical substation 507 is located externally from data center 502, such that at least part of data center 502 can control at least part of electrical substation 507. For example, electrical substation 507 may be located externally from data center 502 and power monitoring system 503 may be located internally to data center 502, and power monitoring system 503 may control at least a part of electrical substation 507, such as one or more switching devices within the electrical substation 507.

In some embodiments, electrical substation 507 includes a switching device that selectively routes power from one power source and isolates power from another power source. For example, electrical substation 507 may selectively route a power feed received from power source 505a and isolate a power feed received from power source 505b, such that power supplied to electrical load 504 originates from power source 505a.

Data center 502 includes one or more transformers 510, one or more generators 512, switching device 511, switchgear 514, and primary power systems 516. Each of primary power systems 516 may include one or more UPSs 518 and one or more power distribution units ("PDUs") 520.

Electrical loads 504 in racks 506 may each receive power from one of primary power systems 516. In some embodiments, each of primary power systems 516 corresponds to, and provides power to, the servers in one room in data center 502. In some embodiments, each of primary power systems 516 corresponds to, and provides power to, one rack system in data center 502. In FIG. 5, for the sake of clarity, electrical loads 504 are shown coupled to only one of PDUs 520. Electrical loads 504 may, however, be coupled to any or all of PDUs 520 in data center 502.

Power distribution units 520 may be floor power distribution units. In some embodiments, power distribution unit 520 includes a transformer that transforms the voltage from switchgear 514. Each of racks 506 may include one or more rack power distribution units 522. The rack power distribution units 522 may distribute power to electrical load 504.

One or more transformers 510 are coupled to electrical substation 507. A transformer 510 may step down power received from electrical substation 507 from a high voltage, a medium voltage, a low voltage, or some combination thereof. For example, electrical substation 507 may include a transformer that selectively routes and steps down voltage of a high-voltage power feed received from power source 505a to a medium voltage, and a transformer 510 may step down the voltage of the power feed to a low voltage.

In some embodiments, one or more generators 512 may provide power to primary power systems 516 in the event of a failure of power from one or both of power sources 505a, 505b to electrical substation 507. In some embodiments, one of generators 512 provides backup power for each of primary power systems 516.

Switching device 511 may selectively route power from one of transformer 510 and generators 512 to electrical load 504. Switching device 511 may also isolate downstream electrical equipment from an upstream power feed. In some embodiments, switching device 511 includes an automatic throw-over switch. In some embodiments, switching device 511 includes an automatic transfer switch.

UPS 518 may provide uninterrupted power to racks 506 in the event of a power failure upstream from UPS 518. In some embodiments, a UPS 518 receives three-phase power from transformer 510. The UPS 518 may supply three-phase power to a floor power distribution unit 520.

PDU power may be any suitable voltage. For example, in some embodiments, PDU power is about 208 volts. In some embodiments, PDU power is about 230 volts. In some embodiments, different electrical loads 504 may operate on different phases of a primary power system 516. Each of the legs may correspond to one phase of the input power. In some embodiments, each leg operates at a voltage between about 220 volts to about 260 volts.

In operation of data center 502, receptacles in rack PDU 522 may be used to supply power to electrical systems in rack 506, such as servers. Electrical systems 504 may be coupled to rack power distribution unit 522 by way of cables.

Each of the legs in rack PDU 522 may include a breaker. In some embodiments, each breaker is a 30 A/32 A single pole MCB. Breakers may be located such that they can be accessed when server racks are in-line (e.g., at the top of rack power distribution unit 126). In one embodiment, power is provided to a rack PDU by way of an 8AWG/6 mm$^2$ 5 core cable and a 30 A NEMA/32 A IEC309 3Ph+N+E Plug.

Reserve power system 530 may provide reserve power for any or all of the electrical loads 504 supplied by primary power systems 516. In some embodiments, reserve power system 530 is powered up at all times during operation of data center 502. Reserve power system 530 may be passive until a failure of one or more components of the primary power system 516 for one or more of electrical loads 504, at which time reserve power system 530 may become active.

For illustrative purposes, three switchgears 514, three UPSs 518, and seven PDUs 520 are shown in FIG. 5. The number of power distribution units, UPSs, and switchgear may, however, vary from embodiment to embodiment (and, within a given embodiment, from system to system). For example, each of UPSs 518 may supply power to any suitable number of power distribution units 520. As another example, each of switchgear 514 may supply power to any suitable number of UPSs 518.

Power monitoring system 503 is coupled to electrical substation 507, switching device 511, generators 512, switchgear 514, and UPSs 518. Power monitoring system 503 can be used to manage distribution of power to the electrical load 504 from one or more power sources. In some embodiments, power is preferentially distributed from one of high-voltage power sources 505a, 505b. Power monitoring system 503 may monitor power data associated with one or more high-voltage power feeds from the high-voltage power sources 505a, 505b to determine whether one of the high-voltage power feeds may potentially be disturbed. In some embodiments, monitoring power data includes monitoring a waveform of a power feed. Disturbance of a power feed includes destabilization, interruption, loss of power, and the like. Data associated with one or more power feeds may be collected by one or more sensor devices (not shown in FIG. 5) coupled to electrical power monitoring system. The sensor devices may be coupled to a high-voltage power transmission line, such that collected data is associated with high-voltage power.

Power monitoring system 503 may respond to detecting a disturbance in a power feed received from a power source 505a, 505b, based at least in part on waveform monitoring, by directing a switching device to switch to another power feed from another power source. For example, where electrical substation 507 selectively routes high-voltage power from power source 505a to transformer 510 to be stepped down to low-voltage power, and power monitoring system 503 determines, based on monitoring a waveform, that the high voltage power from power source 505a may potentially be interrupted, power monitoring system 503 can direct a part of electrical substation 507, which may include one or more switching devices, to switch over to power source 505b, such that high-voltage power is selectively routed from power source 505b to transformer 510, and power source 505a is isolated from components downstream of electrical substation 507.

Power monitoring system 503 may activate and deactivate one or more generators 512 to provide backup power to the electrical load 504 in response to detecting a disturbance in power received from one or more external power sources 505a, 505b. For example, where electrical substation 507 is routing power from power source 505a to transformer 510, power source 505b is interrupted, and power monitoring system 503 detects a disturbance in the power feed from power source 505a, power monitoring system 503 can direct one or more generators 512 to be activated and brought to a standby state. Power monitoring system 503 may determine that, even if the detected disturbance does not indicate that power from power source 505a may be potentially interrupted, the short-term reliability of power source 505a is sufficiently suspect to warrant readying one or more generators so that, if a potential for interruption of power source 505a is determined, power monitoring system 503 can direct switching device 511 to switch over to generators 512 without having to wait for the generators 512 to complete a start-up process.

The activated generators 512 may be kept in a standby state for a predetermined period of time and then deactivated. In a continuation of the above example, after directing one or more generators 512 to be activated, and determining that no further disturbances have been detected in the power feed from power source 505a in a predetermined time period, power monitoring system 503 may determine that the short-term reliability of power source 505a is no longer suspect and deactivate the generators 512 to conserve fuel and minimize operational wear on the generators 512.

In some embodiments, power monitoring system 503 may switch power directly to generators 512 from an external power source 505a, 505b without first switching to power from an alternate external power source, even if one or more external power sources are available. In some embodiments, power monitoring system 503 monitors high-voltage power received from each of power sources 505a, 505b and, in response to determining, based on waveform monitoring, that both power sources 505a, 505b are providing undesirable power, activates one or more generators 512 and directs switching device 511 to switch to the generators 512. For example, where electrical substation 507 is routing power from power source 505a and power source 505b is determined, based on waveform monitoring, to be unstable, power monitoring system 503 may respond to a determination that power received from power source 505a may potentially be interrupted by switching directly to backup power from the generators 512 without first switching to power source 505b.

Power monitoring system 503 may switch to a reserve power system 530 by directing one or more switchgear 514 to isolate primary power system 516 from upstream power sources 505a, 505b, 512. In some embodiments, power monitoring system 503 may direct the primary power system 516 to be isolated so that power is provided to electrical load 504 by the reserve power system 530. In some embodiments, power monitoring system 503 may direct the primary power system 516 to be isolated so that power is provided to electrical load by one or more UPSs 518.

In some embodiments, the power monitoring system 503 may decide between providing backup power from one or more generators 512 or simply isolating the primary power system 516 so that power is supplied from one or more of a UPS 518 and reserve power system 530 for the duration of a potential interruption of a high-voltage power feed. Such a decision may be based upon an anticipated length of the potential interruption. For example, if power monitoring system 503 determines that all high-voltage feeds from power sources 505a, 505b may potentially be interrupted for a short duration, the power monitoring system 503 may direct the primary power system 516 to be isolated and powered by one or more UPSs 518 or reserve power system 530 for the duration of the interruption, thereby conserving resources associated with activating and deactivating the generators 512. In another example, where power monitoring system 503 determines that all high-voltage feeds from power sources 505a, 505b may potentially be interrupted for a long duration, the power monitoring system 503 may activate one or more generators 512 and direct switching device 511 to switch to backup power from the generators 512.

In some embodiments, a determination of whether an interruption duration is "long" or "short" may be determined based upon one or more of an available capacity of one or more of the UPS 518 and reserve power system 530, the anticipated power consumption by the electrical load 504 during the anticipated time elapse of the interruption, and the portion of the available capacity that would be expended to satisfy the anticipated power consumption. An interruption duration may be determined to be "long" or "short", and thereby determining whether the UPS 518, reserve power system 530, or generators 512 are utilized to provide power to the electrical load 504, based upon, for example, whether the portion of available UPS 518 capacity that would be exhausted to meet anticipated consumption during the potential interruption meets or exceeds a predetermined threshold. For example, if the predetermined threshold is 70%, the power monitoring system 503 may choose to isolate the primary power system 516 and rely on UPS 518 to power the electrical load 504 only if the anticipated power consumption by the electrical load 504 during the anticipated interruption time elapse would exhaust no more than 70% of the available capacity of the UPS 518.

In some embodiments, data center 502 does not include some or all of primary power system 516. For example, data center 502 may not include one or more of UPSs 518 and reserve power system 530. The power management capability provided by power monitoring system 503 may enable sufficiently assured uninterruptible power supply through switching between one or more power sources 505a, 505b, and generators 512 to preclude a need for UPSs 518 and reserve power system 530 to provide a sufficient confidence level of an uninterrupted power supply to the electrical load 504.

Figure 6:
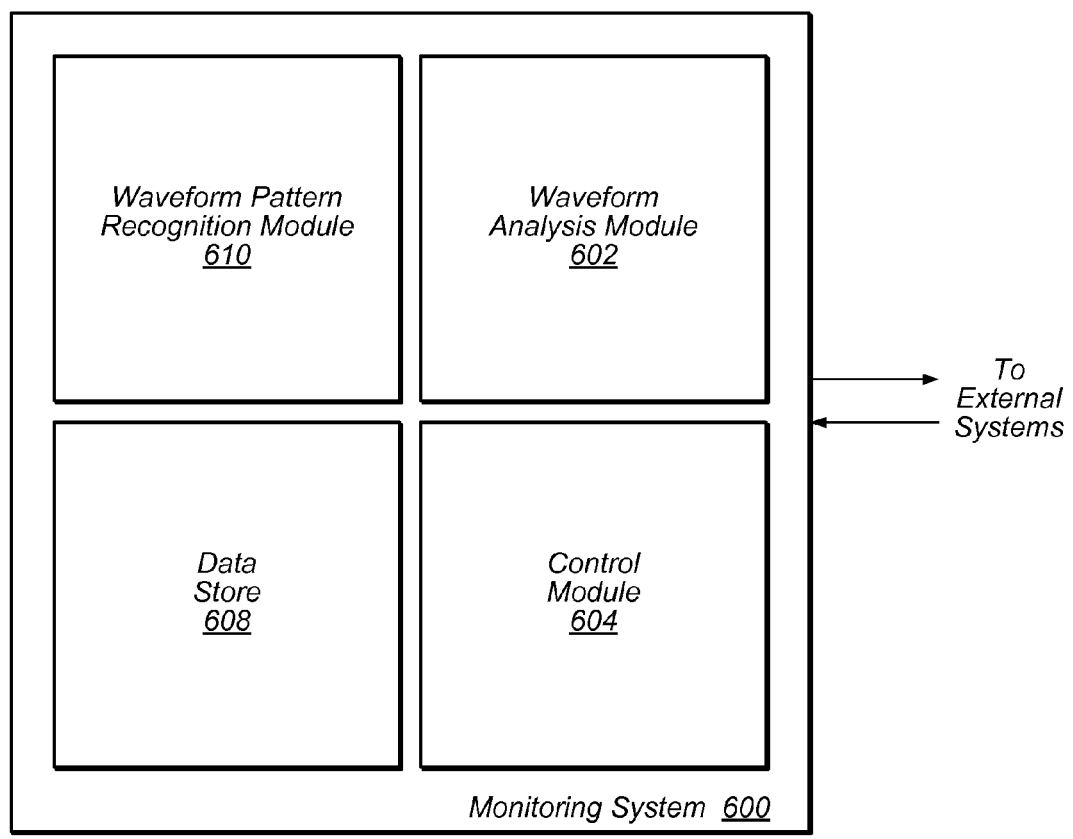
FIG. 6 illustrates one embodiment of a power monitoring system having a waveform analysis module, a control module, a waveform pattern recognition module, and a data store.

FIG. 6 illustrates one embodiment of a power monitoring system having a waveform analysis module, a control module, a waveform pattern recognition module, and a data store.

In some embodiments, power monitoring system 600 includes one or more of a waveform analysis module 602, a control module 604, a data store 608, and a waveform pattern recognition module 610. Some or all of the modules included in power monitoring system 600 may be implemented by one or more components of one or more computing devices. In some embodiments, some or all of the modules in power monitoring system 600 are communicatively coupled to each other. Power monitoring system 600 may be coupled to one or more external systems through one or more communication connections. In some embodiments, individual modules within power monitoring system 600 include individual communication connections to one or more external systems.

Power management system 600 manages power distribution in some or all of a power infrastructure, including, for example, some or all of the systems illustrated in FIG. 1-5. Power distribution management can include, in some embodiments, managing a supply of power to an electrical load. The electrical load may include a data center.

In some embodiments, management by power monitoring system 600 of power supplied to a load includes monitoring a waveform of one or more high-voltage power feeds and selectively routing a high-voltage power feed, such that power is supplied to the load, based upon determinations made from the monitoring. In some embodiments, monitoring a waveform includes monitoring the waveform for one or more waveform patterns indicating one or more particular power events and, upon detecting a waveform pattern, determining that the one or more particular power events may occur in the power feed.

The power monitoring system 600 may monitor a waveform of a power feed based on data associated with the power feed. Such data may be received at the power monitoring system 600 from one or more sensor devices (not shown). In some embodiments, sensor devices from which data is received are located external to power monitoring system 600. For example, power monitoring system 600 may receive data associated with high-voltage power received over one or more power transmission lines from one or more sensor devices coupled to the power transmission lines. Data receipt may occur continuously, intermittently, periodically, or some combination thereof.

In some embodiments, data associated with a power feed is received at the power monitoring system 600 and processed by waveform analysis module 602 to monitor for one or more waveform patterns in a waveform of the power feed. A particular waveform pattern may be associated with a particular power event. For example, the presence of one waveform pattern may indicate normal variations in the power feed. Another waveform pattern may indicate, by its presence in the waveform, that the power feed is experiencing one or more particular disturbances. For example, a waveform pattern may indicate that the power feed is experiencing voltage sag. One or more disturbances may indicate that the power feed may be about to be interrupted, be sufficiently disrupted that the power feed may about to become unusable by an electrical load, etc. As a result, identifying a particular waveform pattern in a waveform of a power feed may indicate that the power feed may potentially be interrupted or otherwise unusable by a load.

Particular power events may represent particular events associated with a power feed, including normal operation, certain specific disturbances in performance, power surges, brief interruptions, total loss of the power feed, etc. For example, the waveform analysis module 602 may determine, based on detection of one or more particular waveform patterns in a waveform of a power feed, that the power is unstable and may potentially fail or otherwise become unusable by a load.

In some embodiments, waveform patterns are a function of one or more characteristics of a waveform. Characteristics can include a rate of change in voltage over time, a rate of change in current over time, frequency of voltage or current, magnitude, slope of variation, some combination thereof, etc. For example, a particular waveform pattern may be identified by a reduced waveform magnitude as a variation of time, a tabled magnitude, etc. Particular waveform patterns may be associated with particular power events associated with a power feed, such that occurrence of the power event in a power feed may be anticipated by identifying an associated waveform pattern in a waveform of the power feed.

Determinations that power events may potentially occur in a power feed may have varying levels of confidence based upon one or more of the particular waveform pattern detected, a correlation between the monitored waveform and the particular waveform pattern, the particular power event associated with the particular waveform pattern, a confidence level of the association between the particular waveform pattern and the particular power event, some combination thereof, or the like. Such levels of confidence may influence decisions made regarding power management.

Control module 604 interacts with various external components to manage power distribution in a power infrastructure. Such interactions can include controlling one or more switching devices, activating one or more backup power sources, etc. In some embodiments, control module 604 receives data associated with various components that is used to determine commands directed by the control module 604 to external systems. For example, where an external backup power source in the power infrastructure includes a diesel generator, control module 604 may receive data from the generator indicating how much diesel fuel is available in the generator's fuel tanks.

In some embodiments, control module 604 interacts with waveform analysis module 602. Upon a determination by waveform analysis module 602 that a particular power event may occur in a power feed, control module 604 may direct one or more components to selectively route one or more power feeds. The components may be external to power monitoring system 600. For example, where high-voltage power received over a first power transmission line is being routed to a load in a power infrastructure, and waveform analysis module 602, in the course of monitoring a waveform of the high-voltage power, detects a particular waveform pattern indicating a particular power event, control module 604 may direct a high-voltage switching device to switch from routing high-voltage power from the first power transmission line to routing high-voltage power from a second power transmission line.

In some embodiments, waveform analysis module 602 may continuously monitor waveforms of some or all power feeds received at an electrical substation, and control module 604 may continuously direct at least a part of the electrical substation to selectively route one or more of the power feeds based upon determinations made by the waveform analysis module 602 based on the monitoring. For example, control module 604 may direct a part of an electrical substation to switch between routing a first power feed to routing a second power feed in response to determining that a quality of power received over the second power feed is higher than power received over the second power feed.

Continuing the example, control module 604 may direct a part of an electrical substation to switch between routing the first power feed to routing a third power feed in response to the waveform analysis module 602 detecting a waveform pattern indicating a first power event in the waveform of the first power feed and concurrently or previously detecting a second power event in the waveform of the second power feed. Subsequently, control module 604 may direct a part of the electrical substation to switch between routing the third power feed to routing the first power feed in response to the waveform analysis module 602 detecting a third waveform pattern in the waveform of the first power feed.

In some embodiments, power monitoring system 600 responds to determining that a power event may potentially occur in a power feed received at an electrical substation by selectively routing one or more power feeds to a transformer. For example, where a first power feed is being routed to a transformer by a switching device, and waveform analysis module 602 detects a waveform pattern in a waveform of the first power feed, the waveform analysis module 602 may respond to the detection by determining that a first power event may potentially occur in the first power feed with a certain level of confidence and control module 604 may, in response to the determination, direct the switching device to switch from the first power feed to a second power feed, such that the second power feed is routed to a transformer and the first power feed is isolated from a transformer.

In some embodiments, the power monitoring system 600 takes different actions based upon different confidence levels of a determination. For example, where the waveform analysis module 602 determines, with an 80% level of confidence, that a first power event may potentially occur in a first power feed, the control module 604 may direct a switching device to switch to another power feed. In another example, where the waveform analysis module 602 determines that a first power event may potentially occur in a first power feed with only a 30% confidence, the control module 604 may choose to continue routing the first power feed. In some embodiments, a confidence threshold, which may be predetermined, adaptively developed over time, or some combination thereof may influence, in part or in full, which action is directed by the control module 604. For example, a confidence level associated with a determination of a particular power event based on detection of a particular waveform pattern may be predetermined to be 60%. In another example, the confidence level may be adaptively created, adjusted, or some combination thereof by the power monitoring system 600 over time based upon observations by the waveform analysis module 602 of occurrences of power events in one or more power feeds and detection of waveform patterns in a waveform of one or more of the power feeds.

In some embodiments, one or more of the power feeds are ranked in terms of preference, such that the control module 604 may direct one or more components to preferentially selectively route the highest-ranking stable power feed. For example, control module 604 may direct a part of an electrical substation to switch between routing a first power feed to routing a third power feed in response to waveform analysis module 602 detecting a waveform pattern indicating a first power event in the waveform of the first power feed, where the third power feed is a higher-ranking power feed than a second power feed. Rankings may be predetermined. In some embodiments, rankings of power feeds are developed and revised continuously, intermittently, periodically, etc., such that a highest-ranking power feed may change over time based upon monitoring of the power feeds by waveform analysis module 602. In some embodiments, rankings of power feeds may be determined by one or more modules of power monitoring system 600. For example, control module 604 may determine a highest-ranking power feed based upon waveform monitoring of multiple power feeds conducted by waveform analysis module 602.

In some embodiments, power monitoring system 600 includes a waveform pattern recognition module 610 that interacts with waveform analysis module 602, data store 608 and one or more other systems to adaptively develop the ability to identify or anticipate disturbances in a power feed over time. Various machine-learning techniques may be applied, at least in part by waveform pattern recognition module 610 to develop the ability to learn to identify or anticipate various disturbances over time. Waveform pattern recognition module 610 may correlate waveform patterns detected by the waveform analysis module 602 with corresponding power events observed by the power monitoring system 600 or some external system to create associations between detected waveform patterns and observed power events for future power management. Power events may be determined to be corresponding to a waveform pattern based upon a determined relationship between the power event and the waveform pattern, including time proximity of occurrences of a threshold number of the power event and the waveform pattern.

For example, waveform analysis module 602 may detect a previously-unknown waveform pattern in a waveform of a high-voltage power feed and, shortly thereafter, detect that the high-voltage power feed is interrupted. The waveform analysis module 602 may respond to detecting an unknown waveform pattern by storing the unknown waveform pattern. The waveform pattern recognition module 610 may respond to one or more occurrences of the unknown waveform pattern and the power interruption event by associating the unknown waveform pattern with the power interruption event such that, upon detecting the waveform pattern in the future, the waveform analysis module 602 may determine that the power interruption event may potentially occur.

In some embodiments, upon determining an association of a waveform pattern with a power event, a portion of power monitoring system 600 may establish pattern identification data associated with the waveform pattern. Such establishment may be performed by one or more modules in power monitoring system 600. Pattern identification data including information identifying associations between known power events and known waveform patterns may be utilized by the waveform analysis module 602 to identify waveform patterns and determine the potential occurrence of power events in a power feed. In some embodiments, the information may include characteristic information associated with a known waveform pattern that identifies the associated one or more power events, such that the waveform analysis module 602 compares a monitored waveform with characteristics of one or more known waveforms and, upon determining a correlation between the monitored waveform and a known waveform pattern based on the characteristics, determines the potential occurrence of an associated power event. In some embodiments, the information may include one or more algorithms utilized by the waveform analysis module to process a waveform, such that, if a certain result of processing the waveform with the algorithm occurs, the potential occurrence or non-occurrence of a particular associated power event is determined.

In some embodiments, various particular waveform patterns may be associated with a common power event. For example, the waveform pattern recognition module 610 may associate several similar but slightly differing waveform patterns with a single power event. The waveform pattern recognition module 610 may, in response to determining that multiple known waveform patterns are associated with a common power event, determine a similarity between the waveform patterns. If two or more of the known waveform patterns are determined to correlate within a certain predetermined threshold, the waveform pattern recognition module 610 may establish standardized pattern identification data for a standardized version of the waveform patterns, such that processing the two or more waveforms with the standardized pattern identification data would result in identification of the standardized waveform pattern. The pattern identification data associated with the two or more known waveform patterns can be removed from use by the waveform analysis module 602 in detecting waveform patterns, deleted, or some combination thereof. In this way, the waveform analysis module 602 can process a waveform with fewer sets of pattern identification data, thereby enhancing effectiveness and efficiency of power monitoring system 600.

In some embodiments, data store 608 may store information related to various modules in power monitoring system 600. For example, data store 608 may store associations between known waveform patterns and known power events. Data store 608 may store pattern identification data associated with known waveform patterns. In some embodiments, information stored at data store 608 is received from an external source. For example, data store 608 may store received data associated with various external components, predetermined data supplied by a user to power monitoring system through a user interface, or the like.

Figure 7A:
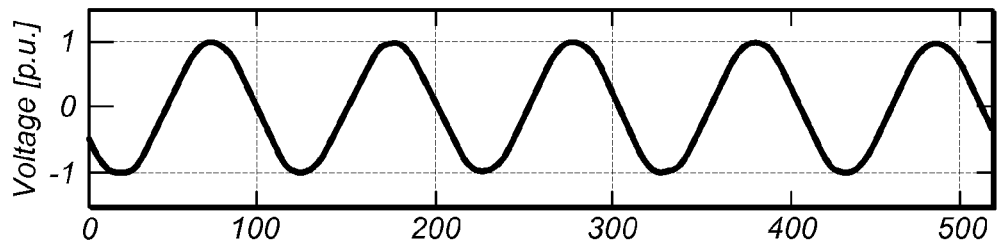
FIG. 7A, FIG. 7B, and FIG. 7C are graphs illustrating power waveforms associated with various power events, according to one embodiment.
Figure 7B:
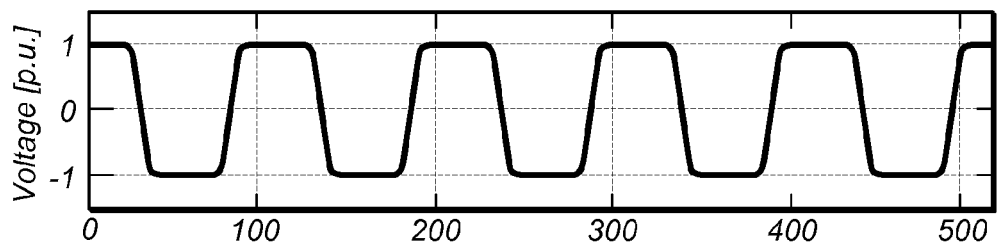
Figure 7C:
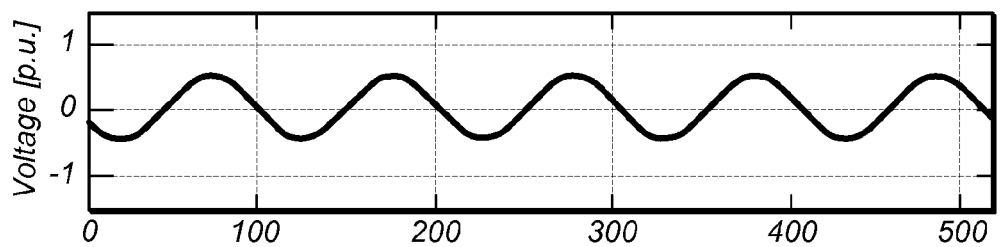

FIG. 7A, FIG. 7B, and FIG. 7C are graphs illustrating power waveforms associated with various power events in a power feed according to one embodiment. A portion of a power monitoring system, including a waveform analysis module, may monitor a waveform of a power feed to identify one or more waveform patterns, where a waveform pattern may indicate a level of quality of the power feed, whether one or more power events may potentially occur in the power feed, etc. The waveform analysis module may, in some embodiments, identify a waveform pattern in the waveform by comparing the waveform to characteristics of one or more known waveform patterns. In some embodiments, the waveform analysis module may identify a waveform pattern in the waveform by processing the waveform using pattern identification data, an algorithm, etc. such that a certain result of the processing indicates whether a power event may potentially occur in the power feed.

It will be appreciated that the illustrated power waveforms are examples of monitored waveforms, and that monitoring waveforms with different characteristics is encompassed by the present disclosure. For example, a waveform pattern may include transitory, non-repeating characteristics. In other examples, waveforms with varying magnitudes, frequencies, and other characteristics may be monitored.

FIG. 7A illustrates an example of a waveform of a high-voltage power feed that may be monitored under normal operating conditions according to one embodiment. The illustrated waveform is a sine wave of voltage over time consistent with normal operation of the power feed. It will be appreciated that in some embodiments a waveform involving variation of current over time may be monitored. A waveform analysis module, upon receiving data associated with the power feed, may process the illustrated waveform and determine that the power feed is operating normally. Normal operation may be determined by identifying a waveform pattern indicating normal power feed operation. The pattern may be identified by processing the waveform with a particular pattern identification data, algorithm, or the like that indicates normal operation based on a certain result of the processing. For example, where a pattern identification data includes a particular algorithm, and processing the waveform using the algorithm produces a certain resultant number, the value of the number may determine normal operation by being within a certain value range.

FIG. 7B and FIG. 7C illustrate examples of a waveform of a high-voltage power feed under disturbed operating conditions according to one embodiment. The waveform of FIG. 7B indicates harmonics and the waveform of FIG. 7C indicates voltage sag. Either waveform pattern may indicate, by its presence, that power quality in the power feed is degraded, destabilized, etc. In some embodiments, presence of the illustrated waveforms of a power feed may indicate that the power feed may potentially be interrupted in the future. Identification of either waveform pattern, and determination of what power event may potentially occur, may involve comparing the waveforms with known harmonics or voltage sag waveform patterns and, upon determining a correlation, identifying one or more power events associated with the correlating waveform pattern. In some embodiments, identification may involve processing the waveforms with algorithms or pattern identification data associated with one or more waveform patterns such that a resultant of the processing that falls within a certain range indicates that the waveform includes a certain waveform pattern associated with a certain one or more power events.

Figure 8:
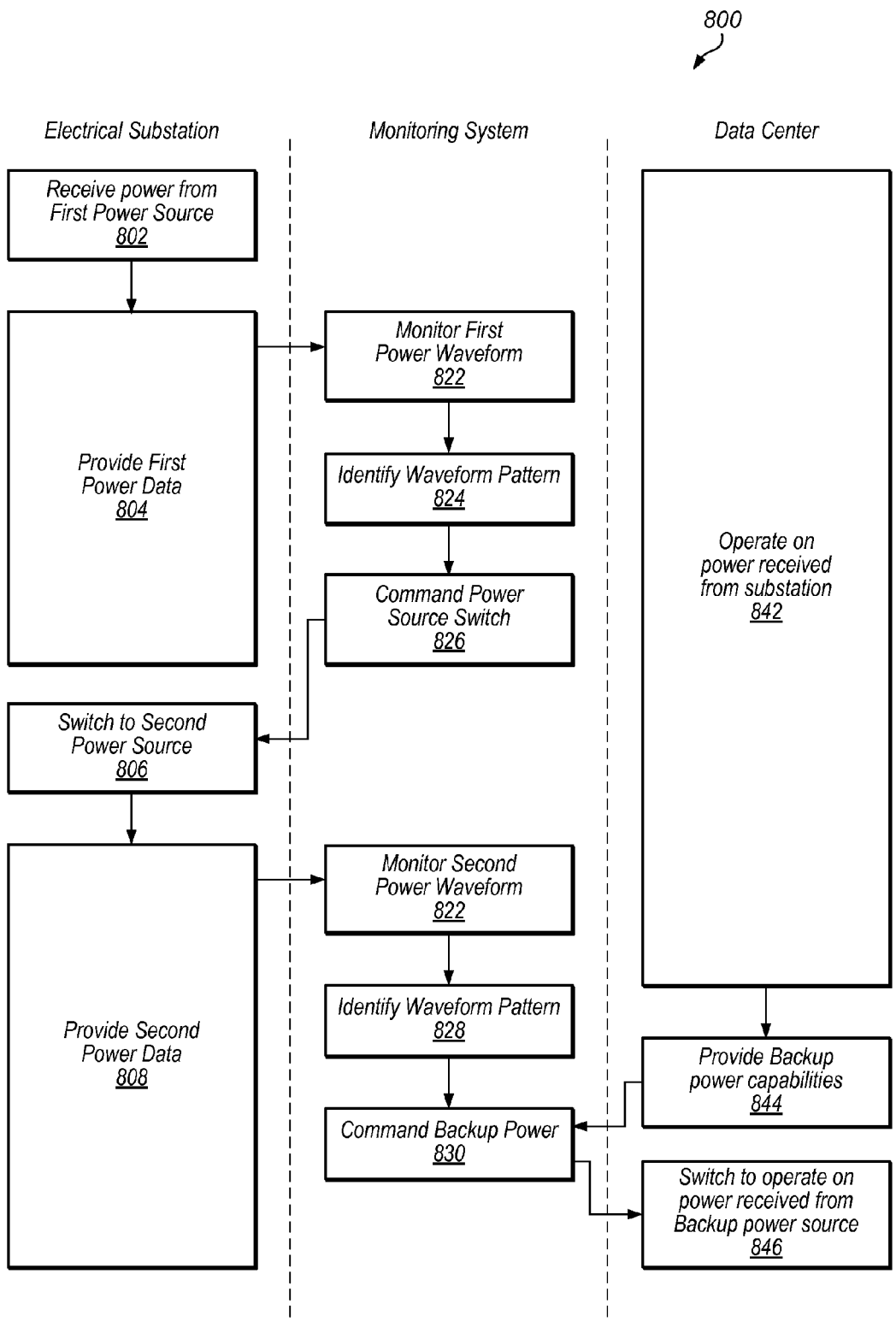
FIG. 8 illustrates operation of a power management infrastructure including an electrical substation, a power monitoring system, and a data center further including a backup generator, according to one embodiment.

FIG. 8 illustrates operation 800 of a power management infrastructure including an electrical substation, a power monitoring system, and a data center further including a backup generator according to one embodiment.

At 802, power is received at the electrical substation from a first power source and routed to the data center. In some embodiments, the power received from the first power source is high-voltage power that is routed within the electrical substation to a transformer, where the power is stepped down to a lower voltage and distributed to the data center.

At 842, the data center operates on power received from the electrical substation. Data center operation may include operating a data center load, which can include various computing systems. In some embodiments, the power is stepped down from a higher voltage as received by the electrical substation from the first power source. For example, the power may be routed through one or more transformers and stepped down to a voltage that data center equipment can receive.

At 804, first power data associated with the power received from the first power source is provided from the electrical substation to the power monitoring system. In some embodiments, the first power data is a power feed including a waveform corresponding to the power received from the first power source. The first power data may be collected by one or more sensor devices coupled to a power transmission line carrying the power from the first power source. For example, where the power received from the first power source is high-voltage power, the sensor devices may include a current transformer, a potential transformer, or some combination thereof.

At 822, the power monitoring system monitors a first waveform of the power received at the electrical substation from the first power source based on the first power data. Monitoring the first waveform may include processing the waveform with various pattern identification data to determine whether certain waveform patterns are present in the first waveform. In some embodiments, monitoring the first waveform may include comparing at least some characteristics of the first waveform with characteristics of one or more known waveform patterns.

At 824, the power monitoring system identifies a first waveform pattern in the first waveform. The first waveform pattern may be associated with one or more power events, such that by identifying the first waveform pattern in the first waveform, the power monitoring system determines that the one or more power events may potentially occur in the power received from the first power source at the electric substation.

At 826, the power monitoring system commands at least a part of the electrical substation to switch between the first power source and second power source, such that the electrical substation selectively routes power from the second power source to the data center and isolates at least the first power source from the data center. In some embodiments, the power monitoring system commands a power source switch in response to determining that the power event that may potentially occur is a power interruption event involving interruption of power from the first power source for some period of time. In some embodiments, a power source switch may be commanded if the power event is a power disturbance event indicating that power from the first power source may become unstable or otherwise unusable for normal operations by the data center.

At 806, the electrical substation switches to the second power source. The switching may be in response, at least in part, to receipt of the command from the power monitoring system to switch to the second power source. In some embodiments, switching is accomplished through the use of one or more switching devices. For example, where power from both the first and second power sources is high-voltage power, switching may involve a high-voltage switching device switching from a first power transmission line carrying high-voltage power from the first power source to a second power transmission line carrying high-voltage power from the second power source.

In some embodiments, the second power source has a voltage lower than that of the first power source. For example, the second power source may be a low-voltage power source, such that power received from the second power source is low-voltage power. The electrical substation may route such power to the data center without routing the power to the same transformer used to step down voltage for power received from the first power source. For example, power from the second power source may be routed directly to the data center.

At 808, second power data associated with the power received from the second power source is provided from the electrical substation to the power monitoring system. At 822, the power monitoring system monitors a second waveform of the power received at the electrical substation from the second power source based on the second power data. Monitoring the second waveform may include processing the waveform with various pattern identification data to determine whether certain waveform patterns are present in the first waveform. The pattern identification data used to process the second power waveform may be similar or different, in part or in full, from pattern identification data used to process the first power waveform.

In some embodiments, first power data continues to be provided to the power monitoring system by the electrical substation, and monitored at the power monitoring system, after the electrical substation switches to the second power source. In some embodiments, first power data and second power data are continuously provided to the power monitoring system regardless of which power source is the origin of power being routed to the data center.

At 828, the power monitoring system identifies a second waveform pattern in the second waveform. The second waveform pattern may be associated with one or more power events, such that by identifying the first waveform pattern in the first waveform, the power monitoring system determines that the one or more power events may potentially occur in the power received from the first power source at the electric substation.

At 844, the data center provides data associated with capabilities of data center backup power systems to the power monitoring system. The data may be used by the power monitoring system to determine whether to switch to backup power and which backup power source to select to supply power to the data center load. In some embodiments, the data center provides data associated with capabilities of data center backup power systems to the power monitoring system continuously, intermittently, periodically, or some combination thereof. In some embodiments, intermittent communication includes communication in response to an event trigger, receipt of a certain request, or the like.

At 830, the power monitoring system commands at least part of the data center to switch to a backup power source and supply backup power to the data center load. The specific backup power source selected may be determined based on various factors, including available capabilities of the backup power source, anticipated duration of the potential power events, etc. At 846, the data center switches to operate the data center load with power received from a backup power source.

Figure 9:
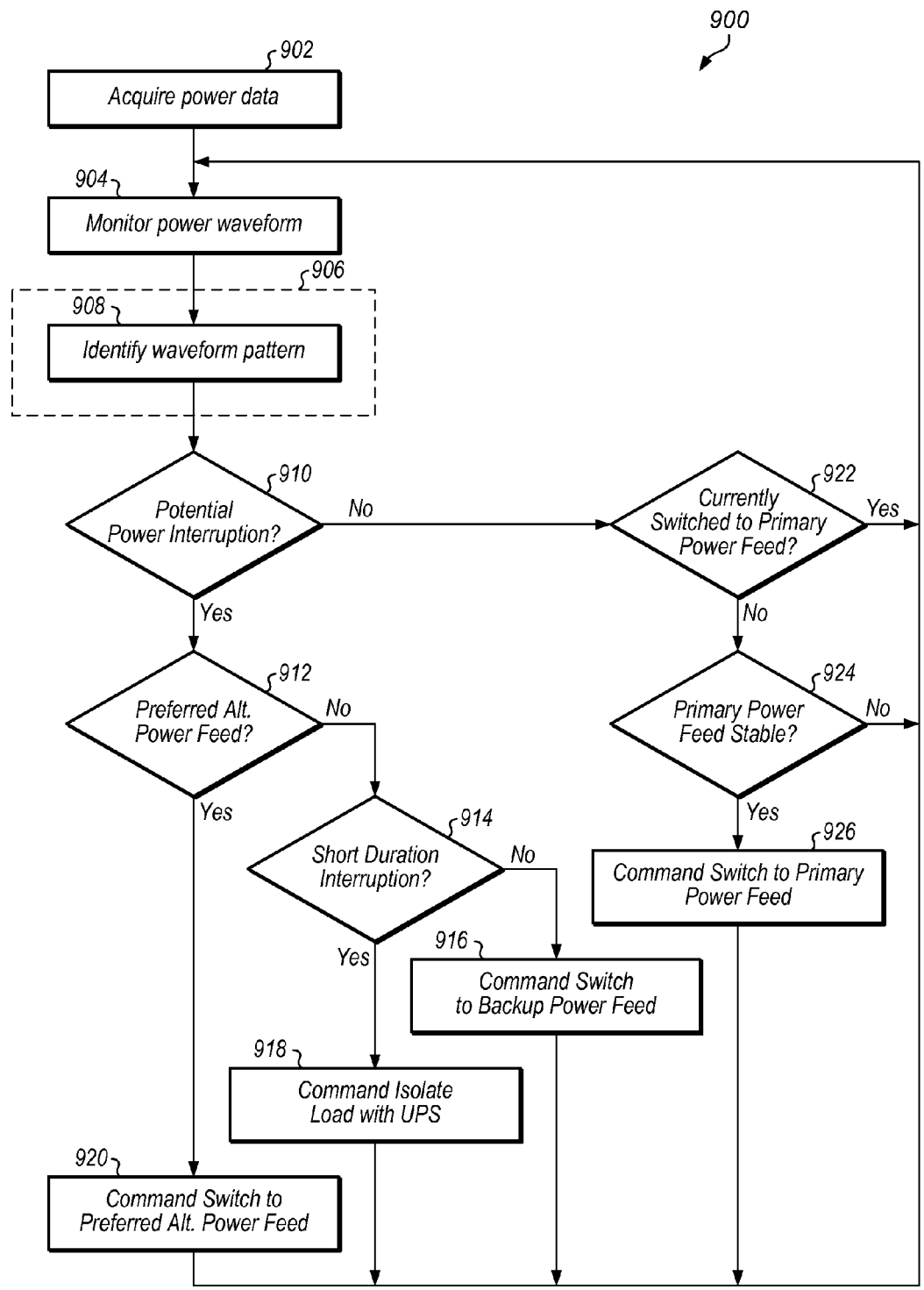
FIG. 9 illustrates managing power feeds supplied to a load, according to one embodiment.

FIG. 9 illustrates managing power feeds 900 supplied to a load according to one embodiment. In some embodiments, the power feeds are managed by some or all of a power monitoring system.

At 902, power data associated with one or more power feeds is acquired. In some embodiments, not all of the power feeds are currently supplied to the load. For example, only one of the power feeds may be supplied to the load, while the other power feeds are isolated from the load.

At 904, the power data is used to monitor a waveform of one or more of the power feeds. In some embodiments, each power feed has a distinct and separate waveform, and each waveform of each power feed is monitored separately. The waveforms of each power feed can be monitored in parallel, in series, or some combination thereof.

At 906 and 908, a waveform pattern is identified in one or more of the waveforms of the one or more power feeds being supplied to the load. In some embodiments, waveform patterns in waveforms of power feeds being isolated from the load are identified.

At 910, a determination is made whether the identified waveform pattern indicates a potential interruption of power in the one or more power feeds being supplied to the load. If not, and the power feeds supplying power to the load include a designated primary power feed, as shown at 922, then the monitoring of power waveforms continues. If not, and the power feeds supplying power to the load do not include a designated primary power feed, and such a power feed is determined to be unstable, as shown at 922 and 924, then the monitoring of power waveforms continues.

If, at 910, 922, 924, and 926, the identified waveform pattern is determined to not indicate a potential interruption of power in the one or more power feeds being supplied to the load, and the power feeds do not include a designated primary power feed, but such a power feed is determined to be stable, then the supply of power to the load is switched to at least include the designated primary power feed.

In some embodiments, stability of a power feed can be determined based upon detection of one or more certain waveform patterns in a waveform of the power feed, where the certain waveform patterns indicate power feed instability, interruption, or the like. In some embodiments, designation of a power feed can be based upon a predetermined ranking of the power feeds, a developed ranking of the power feeds based upon monitored power quality of the feeds, or some combination thereof.

If, at 912 and 920, the identified waveform pattern indicates a potential interruption of power in the one or more power feeds being supplied to the load, then, if a preferred alternative power feed is available, the supply of power to the load is switched to at least include the preferred alternative power feed.

A designation of a preferred alternative power feed may be determined based on various factors. In some embodiments, such a designation is based on one or more of a ranking of power feeds and current availability and stability of the power feed. For example, if a highest-ranked power feed of five ranked power feeds is supplied to a load, a waveform pattern identified in a waveform of the highest-ranked power feed indicates a potential interruption of the feed, and the next three highest-ranked power feeds are unavailable but the last-ranked power feed is available and stable, then the last-ranked power feed may be designated the preferred alternative power feed and switched to supply power to the load.

At 912, 914, and 918, if no preferred alternative feeds are available, and the duration of the potential interruption of power is determined to be short, then the load may be isolated such that power is supplied to the load by a UPS. If, at 912, 914, and 916, no preferred alternative feeds are available, and the duration of the potential interruption of power is determined to be long, then the supply of power to the load is switched to at least include a backup power feed. In some embodiments, a backup power feed includes a power feed supplied by a generator.

In some embodiments where both a UPS and another backup power source are available to supply power to a load, the duration of a potential interruption of a power feed to the load may determine whether the UPS or backup power source is selected to supply power to the load. In some embodiments, a determination of whether an interruption duration is "long" or "short" may be determined based upon one or more of an available capacity of the UPS, the anticipated power consumption by the load during the anticipated length of the interruption, and the portion of the available capacity that would be expended to satisfy the anticipated power consumption. Interruption duration may be determined to be "long" or "short", and thereby determining whether the UPS or backup power source is utilized to provide power to the load, based upon whether the portion of available UPS capacity that would be exhausted to meet anticipated consumption during the interruption meets or exceeds a predetermined threshold. For example, if the predetermined threshold is 70%, the duration may be determined to be short, and the load powered by the UPS, only if the anticipated power consumption by the load during the anticipated interruption length would exhaust no more than 70% of the available capacity of the UPS.

In some embodiments, no further action is commanded in response to identifying a potential power interruption. For example, if, at 914, a duration of the potential interruption of power is determined to be short, then no action may be taken, such that a UPS may automatically provide power to the load upon occurrence of the power interruption without requiring commanding isolation of the load.

Figure 10:
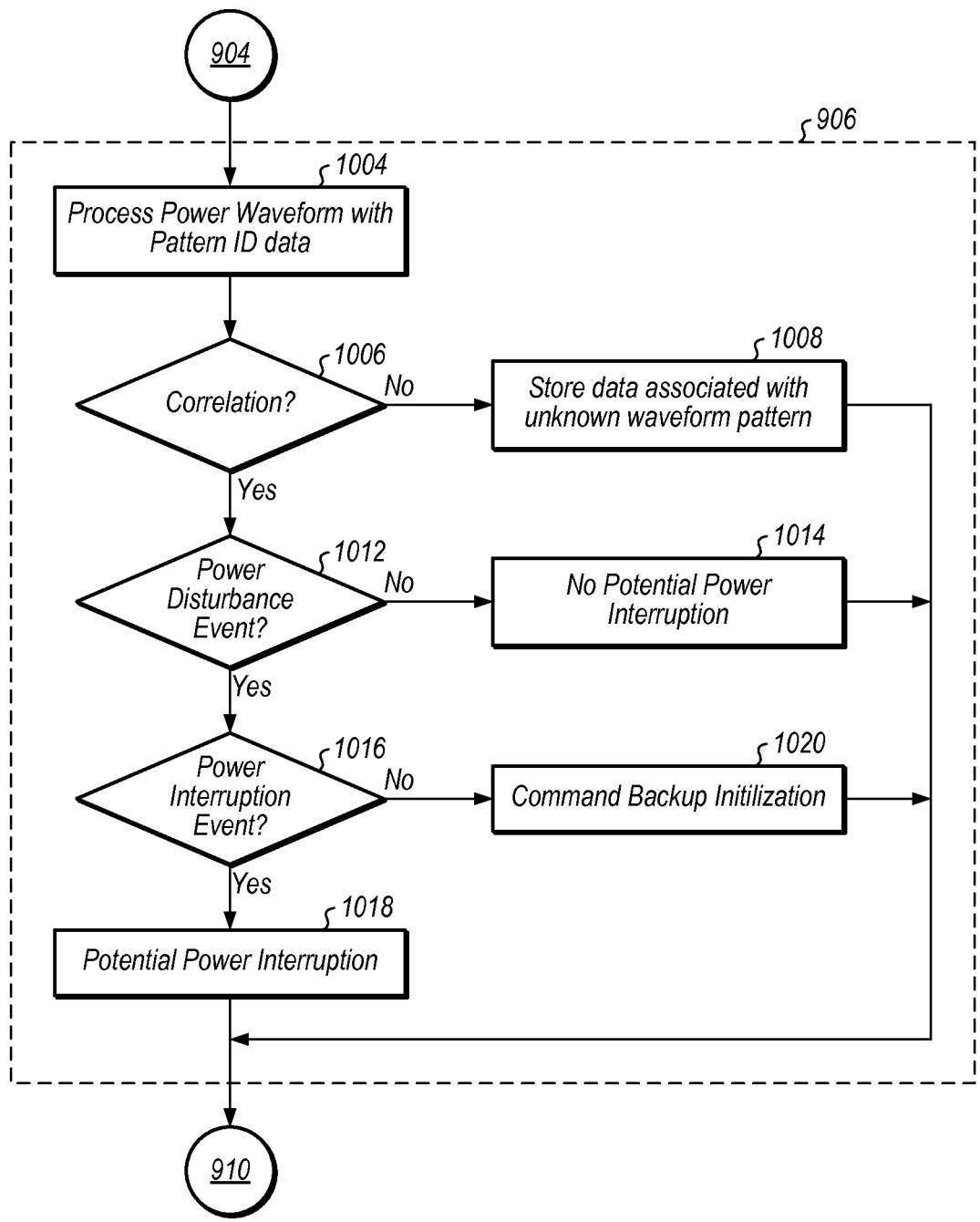
FIG. 10 illustrates identifying a waveform pattern in a power waveform, according to one embodiment.

FIG. 10 illustrates identifying 906 a waveform pattern in a power waveform according to one embodiment. The identification 906 of a waveform pattern illustrated in FIG. 10 encompasses the identification of a waveform pattern 908 as illustrated in FIG. 9 following 904 and preceding 910.

At 1004, the power waveform of one or more power feeds is processed with one or more sets of pattern identification data. In some embodiments, each set of pattern identification data is used to detect one or more certain waveform patterns by processing the power waveform using the data. The pattern identification data may include one or more algorithms, one or more variable values to be used in a waveform processing algorithm, or some combination thereof. For example, a waveform may be processed using first, second, and third sets of pattern identification data, where each set corresponds to a separate first, second, or third waveform pattern and includes distinct variables for a general waveform processing algorithm and a known range of resultant values indicating presence of the respective waveform pattern. The power waveform may be processed by the general waveform algorithm three times, each time using variable values from one of the sets of pattern identification data, and each resultant may be compared against a corresponding resultant range for the set of pattern identification data, such that if the resultant falls within the range, the corresponding waveform pattern for the set of pattern identification data may be present in the power waveform. In another example, each set of pattern identification data may include a distinct resultant value range for a general waveform algorithm, such that a resultant of the general waveform algorithm indicates a particular waveform pattern and associated one or more power events if the resultant is within the distinct resultant value range.

The pattern identification data may include an indication of one or more power events associated with the certain waveform pattern, such that presence of the waveform pattern in the waveform indicates potential occurrence of the one or more power events.

In some embodiments, the pattern identification data includes characteristics of a waveform pattern, such that processing a waveform with the pattern identification data involves comparing characteristics of the waveform to determine if a correlation exists within a certain predetermined level of confidence.

At 1006 and 1008, if the power waveform does not correlate with any of the sets of pattern identification data, data associated with the unknown waveform pattern is stored. In some embodiments, the data is used to associate the unknown waveform pattern with a power event. For example, where a waveform does not correlate with known waveform patterns indicating normal operations, disturbances, interruptions, or some combination thereof, the waveform pattern may be preserved for future association by a waveform pattern recognition module with a power event.

At 1006, 1012, and 1014, if the power waveform correlates with at least one known waveform pattern, and the known waveform pattern indicates a power event that is not a power disturbance event, then no potential power interruption is detected. For example, a known waveform pattern may be associated with normal power feed operations, such that correlation of a waveform with the known waveform pattern indicates normal power feed operations.

At 1012, 1016, and 1020, if the power waveform correlates with at least one known waveform pattern that indicates a power disturbance event in the power feed, but the power disturbance event is not a power interruption event, then a backup power source is initialized and placed in a standby state for a predetermined period of time. In some embodiments, a power disturbance event indicates that a power feed is disturbed from normal operations, but may not potentially be interrupted. For example, a power event indicating a power feed fluctuation caused by a lighting strike may be interpreted as a power disturbance event that is not a power interruption event. In some embodiments, a backup power source may be activated in response to a power disturbance event to provide a ready source of backup power in the event that a waveform pattern indicating a power interruption event is identified in the power feed within the predetermined period of time. For example, if a waveform pattern indicating an intermittent fault is identified, a backup power source may be activated. After an elapse of the predetermined period of time, the backup power source may be deactivated in response to determining that the power feed is not at risk of a potential interruption.

At 1016 and 1018, if the power waveform correlates with a power disturbance event that is a power interruption event, a potential power interruption in the power feed is determined.

Figure 11:
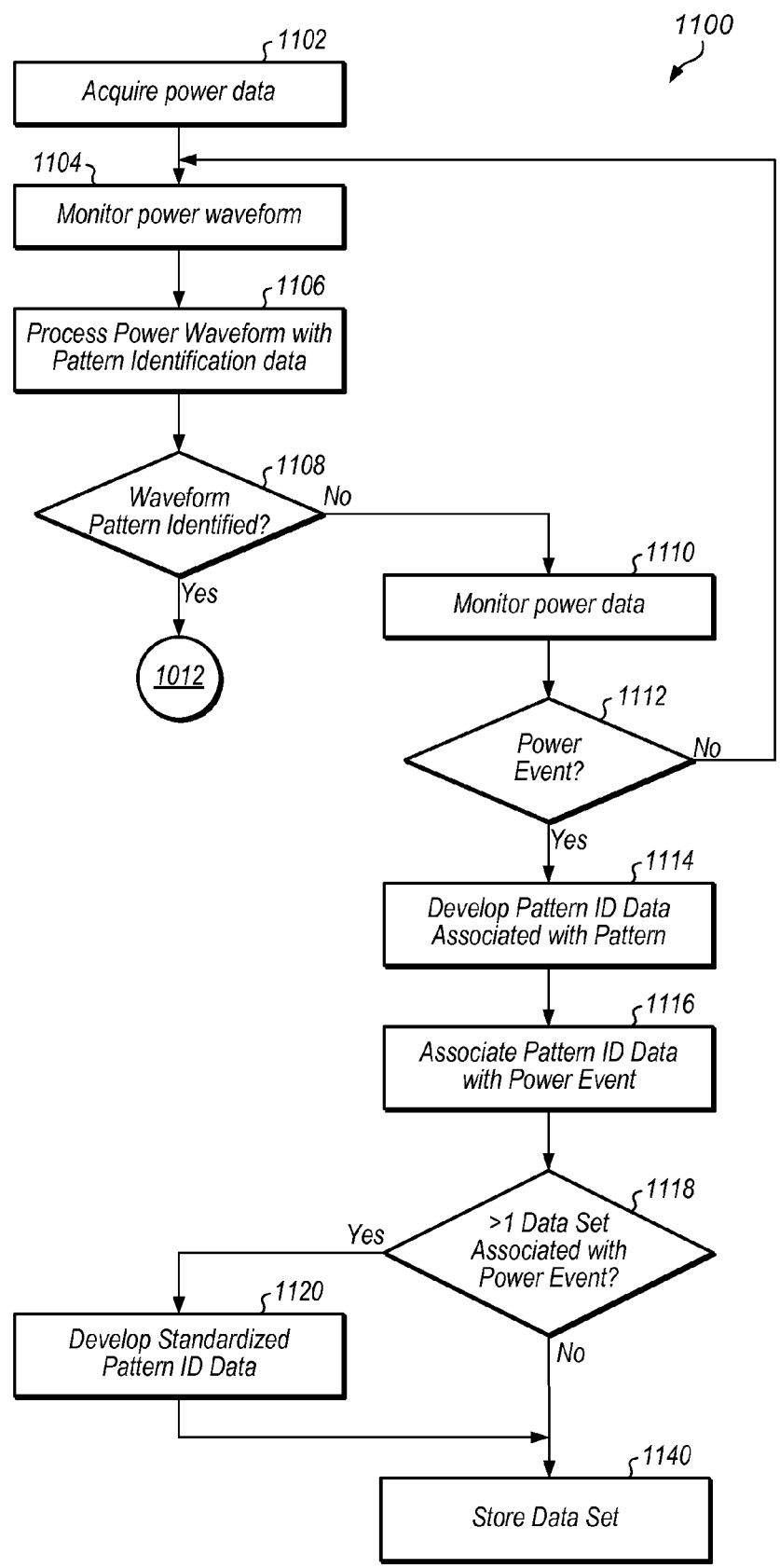
FIG. 11 illustrates developing pattern identification data associated with a power event, according to one embodiment.

FIG. 11 illustrates developing 1100 pattern identification data associated with a power event according to one embodiment.

At 1102, power data associated with one or more power feeds is acquired. In some embodiments, not all of the power feeds are currently supplied to the load. For example, only one of the power feeds may be supplied to the load, while the other power feeds are isolated from the load.

At 1104, the power data is used to monitor a waveform of one or more of the power feeds. In some embodiments, each power feed has a distinct and separate waveform, and each waveform of each power feed is monitored separately. The waveforms of each power feed may be monitored in parallel, in series, or some combination thereof.

At 1106, the power waveform of one or more power feeds is processed with one or more sets of pattern identification data. In some embodiments each set of pattern identification data is used to detect one or more certain waveform patterns by processing the power waveform using the data.

At 1108 and 1012, if a waveform pattern is identified, then a determination is made regarding the nature of one or more power events associated with the identified waveform pattern, as illustrated above in FIG. 10.

At 1108 and 1110, if the power waveform does not correlate with any of the sets of pattern identification data, power data associated with the power feed is monitored for occurrence of power events in the power feed. In some embodiments, the power waveform is classified as an unknown waveform pattern and is stored, in part or in full. If, at 1112, no power event occurs in the power feed, monitoring of the power waveform continues.

At 1112, 1114, and 1116, if a power event occurs in the power feed, an association is established between the unknown power event and the occurring power event. Pattern identification data associated with the unknown waveform pattern is developed. The pattern identification data may be used to identify the unknown waveform pattern in the future through processing of power waveforms. In some embodiments, pattern identification data includes one or more characteristics of the waveform pattern. In some embodiments, pattern identification data includes an algorithm used to process power waveforms, one or more variable values used in processing a power waveform using a general processing algorithm, some combination thereof, or the like.

At 1118, a determination is made whether multiple sets of pattern identification data are associated with a common power event.

At 1120, if multiple sets of pattern identification data are associated with a common power event, then a set of standardized pattern identification data is developed from two or more of the pattern identification data associated with the common power event. In some embodiments, the pattern identification data used to develop the set of standardized pattern identification data is selected based upon a comparison of the data to determine which sets of data are similar. Similarity may be determined, in some embodiments, based upon a correlation with data that exceeds a certain threshold value.

In some embodiments, a set of standardized pattern identification data is used to process power waveforms in place of the two or more sets of pattern identification data from which it was developed, thereby increasing waveform processing efficiency.

At 1140, the data set is stored for use in processing power waveforms.

Figure 12:
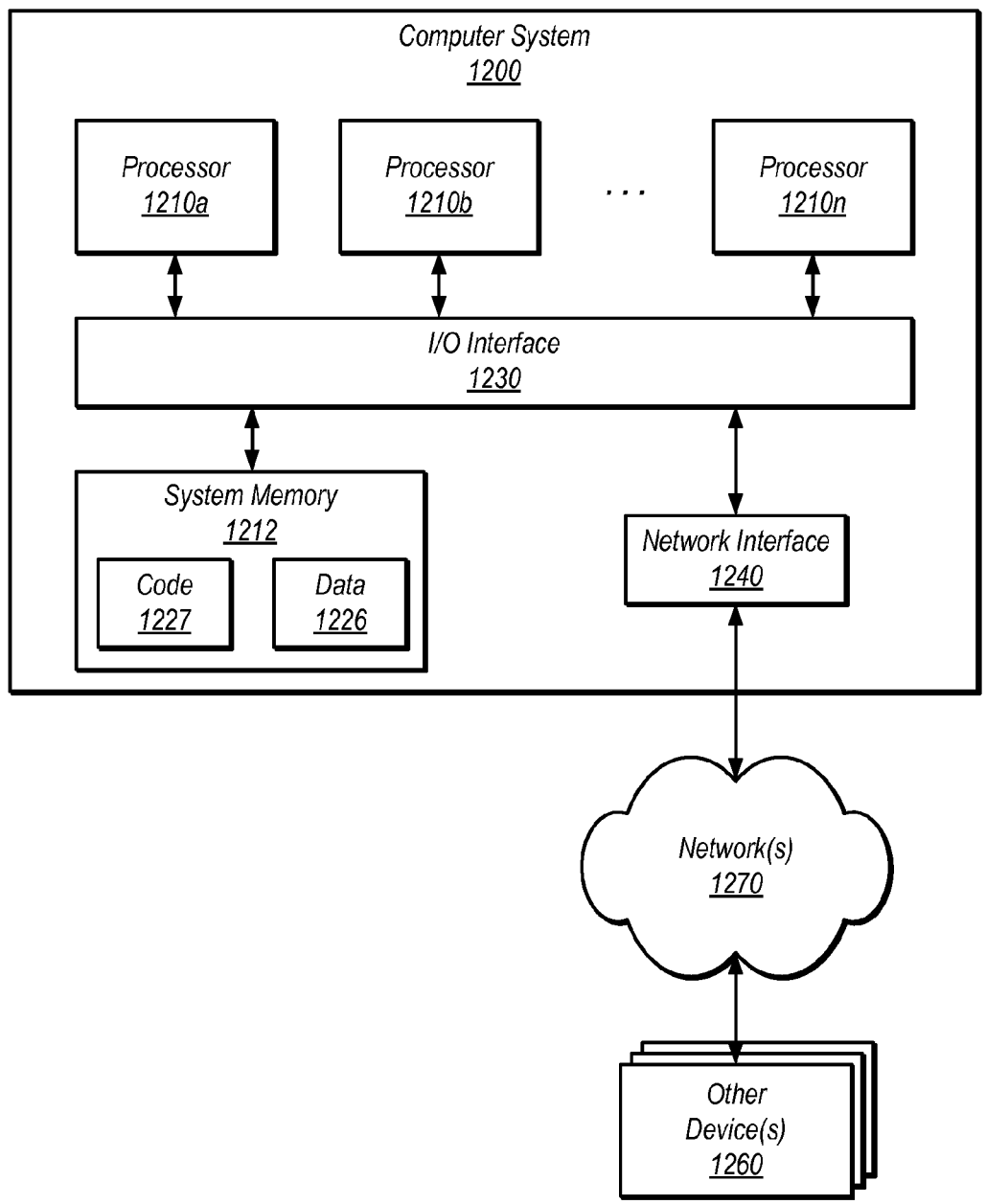
FIG. 12 is a block diagram illustrating an example computer system that may be used in some embodiments.

FIG. 12 is a block diagram illustrating an example computer system that may be used in some embodiments.

In some embodiments, a system that implements a portion or all of one or more of the technologies, including but not limited to a portion or all of the power infrastructure, one or more modules included in the power monitoring system, and various power management methods, systems, devices, and apparatuses as described herein, may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of the power infrastructure, one or more modules included in the power monitoring system, and various power management methods, systems, devices, and apparatuses as described herein, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIGS. 1 through 12, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data for implementing embodiments of power management methods as described above relative to FIGS. 1-11. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a data center configured to operate based on a supply of low-voltage power;
   an electrical substation electrically coupled to the data center, the electrical substation comprising:
   a transformer configured to step down high-voltage power into low-voltage power supplied to the data center, and
   at least one switching device configured to selectively route high-voltage power to the transformer from one of a primary utility power source and an alternate utility power source; and
   a power waveform monitoring system configured to:
   monitor at least a primary waveform associated with high-voltage power received from the primary utility power source for a first waveform pattern indicating potential interruption of high-voltage power received from the primary utility power source, and monitor an alternate waveform associated with the alternate utility power source for an alternate waveform pattern indicating potential interruption of high-voltage power from the alternate utility power source;
   in response to identifying the first waveform pattern while monitoring the primary waveform without identifying the alternate waveform pattern while monitoring the alternate waveform, direct the switching device to switch from selectively routing high-voltage power from the primary utility power source to selectively routing high-voltage power from the alternate utility power source, such that switching occurs prior to an interruption of high voltage power from the primary utility power source, and further such that operations of the data center are uninterrupted due to the switching; and
   in response to identifying the first waveform pattern and identifying the alternate waveform pattern indicating potential interruption of high-voltage power from the primary utility power source and from the alternate utility power source, determine whether the potential interruption of high-voltage power from both the primary utility power source and the alternate utility power source is associated with an interruption duration such that an uninterruptible power source can supply backup power during the potential interruption of high-voltage power from both the primary utility power source and the alternate utility power source by expending less than a predetermined fraction of uninterruptible power source capacity, and in response to determining that the potential interruption of high-voltage power from both the primary utility power source and the alternate utility power source is associated with the interruption duration, isolate the data center from both the primary utility power source and the alternate utility power source and supply low-voltage power to the data center from the uninterruptible power source.

2. The system of claim 1, the power waveform monitoring system further configured to:
   subsequent to the switching and in response to identifying a second waveform pattern in the primary waveform, the second waveform pattern indicating uninterrupted receipt of high-voltage power, direct the switching device to switch from selectively routing high-voltage power from the alternate utility power source to selectively routing high-voltage power from the primary utility power source.

3. The system of claim 1, wherein the data center and the electrical substation are controlled by a common entity.

4. The system of claim 1, wherein the power waveform monitoring system is further configured to:
   in response to determining that the potential interruption of high-voltage power from both the primary utility power source and the alternate utility power source is not associated with the interruption duration, direct another switching device to switch from forwarding either of the primary utility power source and the alternate utility power source to forwarding a backup power feed supplied by a backup power device.

5. A system comprising:
   at least one computing device comprising:
   a waveform analysis module configured to:
   monitor a first waveform associated with high-voltage power received from a first high-voltage power feed to identify a first waveform pattern that indicates potential interruption of high voltage power from at least the first high-voltage power feed of a plurality of high-voltage power feeds received at an electrical substation, wherein the electrical substation transforms at least one of the plurality of high-voltage power feeds to a low-voltage power output supplied to a low-voltage power load of a data center, and
   monitor a second waveform associated with high-voltage power received from a second high-voltage power feed of the plurality of high-voltage power feeds to identify a second waveform pattern indicating potential interruption of high-voltage power from the second high voltage power feed; and
   a control module configured to;
   in response to identification by the waveform analysis module of the first waveform pattern while monitoring the first waveform without identification of the second waveform pattern while monitoring the second waveform, direct a switching device to switch from selectively routing high-voltage power from the first high-voltage power feed to selectively routing high-voltage power from the second high-voltage power feed, such that switching occurs prior to an interruption of high-voltage power from at least the first high voltage power feed, and further such that operations of the data center are uninterrupted due to the switching; and
   in response to identifying the first waveform pattern and identifying the second waveform pattern indicating potential interruption of high-voltage power from the first high-voltage power feed and from the second high-voltage power feed, determining whether the potential interruption of high-voltage power from both the first high-voltage power feed and the second high-voltage power feed is associated with an interruption duration such that an uninterruptible power source can supply backup power to the low-voltage power load during the potential interruption of high-voltage power from both the first high-voltage power feed and the second high-voltage power feed by expending less than a predetermined fraction of uninterruptible power source capacity, and in response to determining that the potential interruption of high-voltage power from both the first high-voltage power feed and the second high-voltage power feed is associated with the interruption duration, isolate the low-voltage power load from both the first high-voltage power feed and the second high-voltage power feed and supply low-voltage power to the low-voltage power load from the uninterruptible power source.

6. The system of claim 5, wherein, to identify the first waveform pattern, the waveform analysis module is configured to determine a correlation between the first waveform of at least the first high-voltage power feed and pattern identification data associated with at least one known power event.

7. The system of claim 6 comprising a waveform pattern recognition module configured to:
monitor both performance of at least the first high-voltage power feed and the first waveform associated with at least the first high-voltage power feed, wherein monitoring performance includes identifying an occurrence of at least one known power event in the first high-voltage power feed and monitoring the first waveform includes identifying at least the first waveform pattern; and
based at least in part on the monitoring, establish at least an association between the at least first waveform pattern and the at least one known power event; and
in response to establishing the association, establish pattern identification data configured to correlate the first waveform pattern with the at least one known power event.

8. The system of claim 7, the waveform pattern recognition module further configured to:
based at least in part on the monitoring, establish associations between a plurality of known waveform patterns and the at least one known power event; and
establish a standardized pattern identification data associated with the at least one known power event, wherein the standardized pattern identification data is developed based at least in part on the plurality of known waveform patterns.

9. The system of claim 5, wherein the waveform analysis module is configured to continuously monitor waveforms of at least some of the plurality of high-voltage power feeds.

10. The system of claim 9, wherein the control module is configured to respond to identification, by the waveform analysis module, of a subsequent waveform pattern associated with the first waveform of at least the first high-voltage power feed, wherein, to respond to the identification, the control module is configured to direct at least a part of the electrical substation to switch from transforming at least the second high-voltage power feed to transforming at least the first high-voltage power feed.

11. The system of claim 5, wherein the control module is further configured to: in response to determining that the potential interruption of high-voltage power from both the first high-voltage power feed and the second high-voltage power feed is not associated with the interruption duration, direct another switching device to switch from forwarding either of the first high-voltage power feed and the second high-voltage power feed to forwarding a backup power feed supplied by a backup power device.

12. A method, comprising:
performing, by at least one computing device:
determining potential interruption of a first high-voltage power feed based on monitoring a first waveform associated with the first high-voltage power feed for a first waveform pattern that indicates the potential interruption of the first high-voltage power feed;
in response to the determined potential interruption of the first high voltage power feed, directing a first switching device to switch from forwarding the first high-voltage power feed to forwarding a second high-voltage power feed;
determining potential interruption of both the first high-voltage power feed and the second high-voltage power feed based on monitoring both the first waveform associated with the first high-voltage power feed for the first waveform pattern and monitoring a second waveform associated with the second high-voltage power feed for a second waveform pattern that indicates a potential interruption of the second high-voltage power feed; and in response to determining the potential interruption of both feeds, determining whether the potential interruption of both feeds is associated with an interruption duration, such that an uninterruptible power source can supply backup power during the potential interruption of both feeds by expending less than a predetermined fraction of power supply capacity associated with the uninterruptible power source; and
in response to determining that the potential interruption of both feeds is associated with the interruption duration, isolating downstream low-voltage loads from both the first high-voltage power feed and the second high-voltage power feed and supplying low-voltage power to the low-voltage loads from the uninterruptible power source.

13. The method of claim 12, further comprising:
determining potential interruption of a particular one of a plurality of high-voltage power feeds based upon monitoring a plurality of waveforms, wherein each of the plurality of waveforms is associated with a separate one of the plurality of high-voltage power feeds; and
in response to determining potential interruption of the particular one of a plurality of high-voltage power feeds, directing the first switching device to switch from forwarding the particular one high-voltage power feed to forwarding an alternate high voltage power feed of the plurality of high-voltage power feeds, wherein the alternate high-voltage power feed is selected based upon a comparison of relative performances of the plurality of high-voltage power feeds.

14. The method of claim 12, determining potential interruption of the first high-voltage power feed comprising:
identifying the first waveform pattern in the first waveform; and
associating the first waveform pattern with a power interruption event indicating potential high-voltage power feed interruption based upon a correlation between the first waveform pattern and data associated with the power interruption event.

15. The method of claim 14 comprising:
in response to determining stability of the first high-voltage power feed, based on monitoring the first waveform, directing the first switching device to switch back to forwarding the first high-voltage power feed, wherein
determining stability of the first high-voltage power feed comprises identifying a third waveform pattern associated with high-voltage power feed stability in the first waveform.

16. The method of claim 12, further comprising, in response to determining potential interruption of both the first high-voltage power feed and the second high-voltage power feed:
in response to determining that the potential interruption of both feeds is not associated with the interruption duration, directing a second switching device to switch from forwarding either of the first high-voltage power feed and the second high-voltage power feed to forwarding a backup power feed supplied by a backup power device.

17. The method of claim 12 comprising:
identifying the first waveform pattern in the first waveform associated with the first high-voltage power feed;
associating the first waveform pattern with a power disturbance event indicating unstable high-voltage power feed receipt based upon a correlation between the first waveform pattern and data associated with the power disturbance event; and
in response to the associating, maintaining a forwarding of the first high-voltage power feed and initializing a backup power device into a standby state for a period of time, the backup power device configured to supply a backup power feed.

* * * * *